(12) United States Patent
Deb et al.

(10) Patent No.: US 8,089,479 B2
(45) Date of Patent: Jan. 3, 2012

(54) DIRECTING CAMERA BEHAVIOR IN 3-D IMAGING SYSTEM

(75) Inventors: Sidhartha Deb, Santa Monica, CA (US);
Gregory Niles, Culver City, CA (US);
Stephen Sheeler, Santa Monica, CA (US); Guido Hucking, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 910 days.

(21) Appl. No.: 12/101,935

(22) Filed: Apr. 11, 2008

(65) Prior Publication Data

US 2009/0256837 A1    Oct. 15, 2009

(51) Int. Cl.
*G06T 15/00* (2011.01)

(52) U.S. Cl. ........ 345/419; 345/422; 345/629; 345/473; 715/850; 715/854; 382/154; 382/285; 701/208

(58) Field of Classification Search ............... 345/419, 345/422, 619, 629, 453, 454, 473, 474, 475; 715/850, 854; 382/154, 285; 701/208
See application file for complete search history.

(56) References Cited

U.S. PATENT DOCUMENTS

| | | | |
|---|---|---|---|
| 5,835,693 A | 11/1998 | Lynch et al. | |
| 6,346,938 B1 | 2/2002 | Chan et al. | |
| 6,466,207 B1 | 10/2002 | Gortler et al. | |
| 6,883,146 B2 * | 4/2005 | Prabhu et al. | 715/854 |
| 6,907,579 B2 * | 6/2005 | Chang | 715/850 |
| 7,814,436 B2 * | 10/2010 | Schrag et al. | 715/851 |
| 7,865,301 B2 * | 1/2011 | Rasmussen et al. | 701/208 |
| 2003/0235344 A1 | 12/2003 | Kang et al. | |
| 2005/0219239 A1 | 10/2005 | Mashitani et al. | |
| 2006/0205502 A1 | 9/2006 | Kaneshige et al. | |
| 2007/0279435 A1 | 12/2007 | Ng et al. | |
| 2009/0226080 A1 | 9/2009 | Boyd et al. | |
| 2010/0085351 A1 | 4/2010 | Deb et al. | |

FOREIGN PATENT DOCUMENTS

| | | |
|---|---|---|
| EP | 0782104 | 7/1997 |
| EP | 1107188 | 6/2001 |
| EP | 1132123 | 9/2001 |
| WO | WO 2009/114208 | 9/2009 |
| WO | WO 2009/126748 | 10/2009 |

OTHER PUBLICATIONS

Shade, Jonathan, et al., "Layered Depth Images," Proceedings of the 25th Annual Conference on Computer Graphics and Interactive Techniques, Jul. 19-24, 1998, pp. 231-242, ACM, New York, New York, USA.
International Search Report and Written Opinion of PCT/US2009/039969, Dated Jul. 23, 2010, Apple Inc.
International Preliminary Report on Patentability for PCT/US2009/039969, Dated Oct. 12, 2010, Apple Inc.
International Search Report and Written Opinion for PCT/US2009/030783, Dated Jun. 22, 2009, Apple Inc.

* cited by examiner

*Primary Examiner* — Phu Nguyen
(74) *Attorney, Agent, or Firm* — Adeli & Tollen LLP

(57) ABSTRACT

A method of associating a computer generated camera with an object in a three-dimensional computer generated space. The method receives a command to associate the camera with an object in the simulated space. Based on the command the method determines a path for moving the camera to a position near the object and aiming the camera at the object. The method creates a video from the simulated camera's perspective of the three-dimensional simulated space.

31 Claims, 35 Drawing Sheets

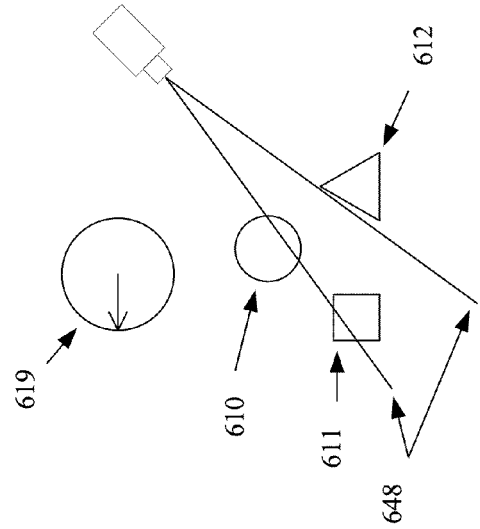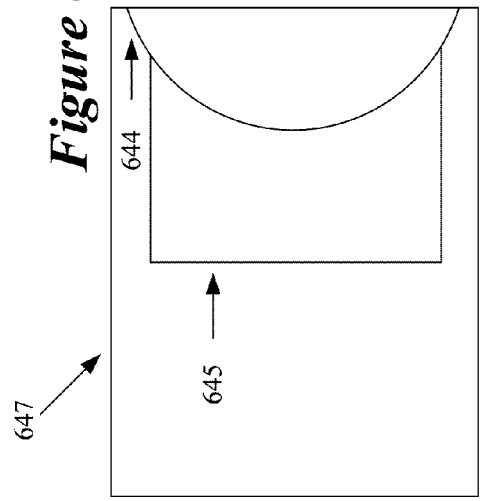
*Figure 6d*
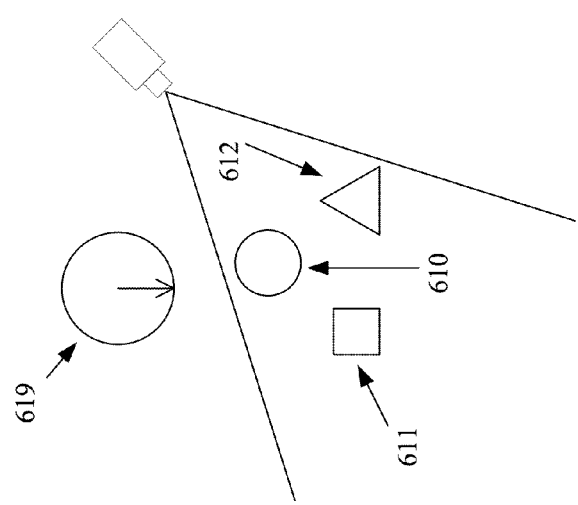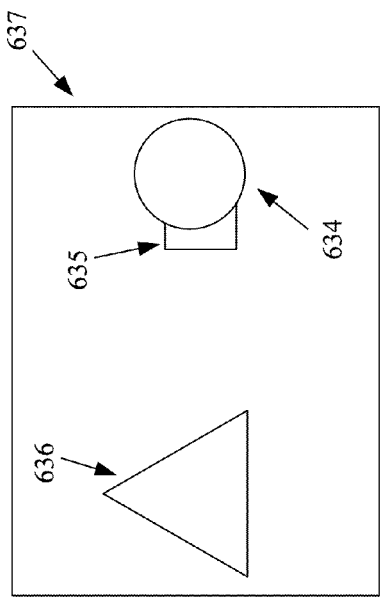
*Figure 6c*

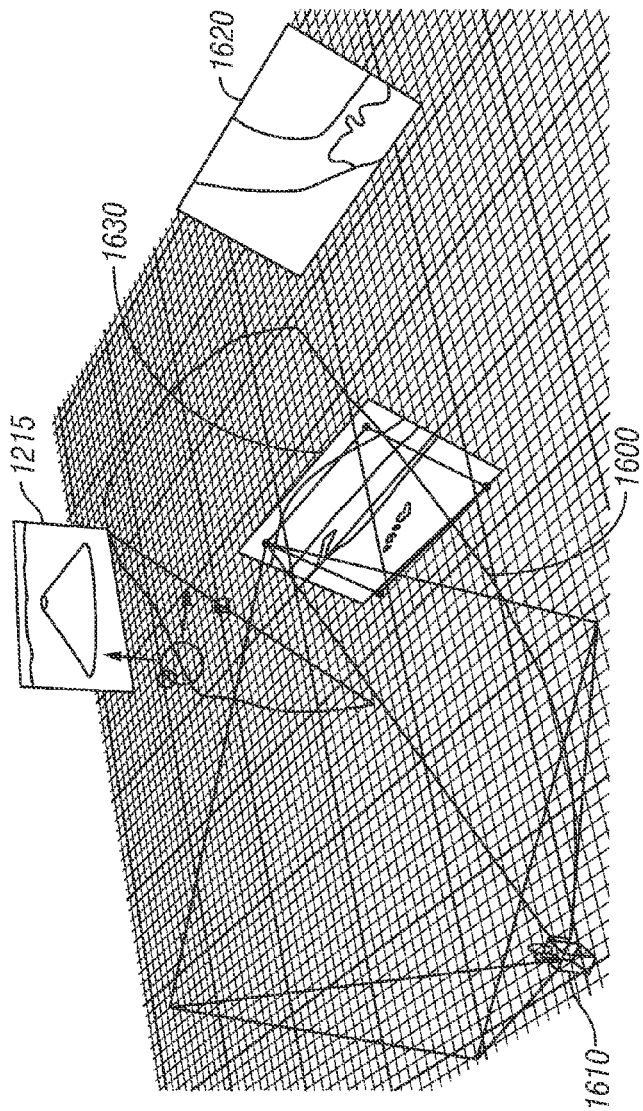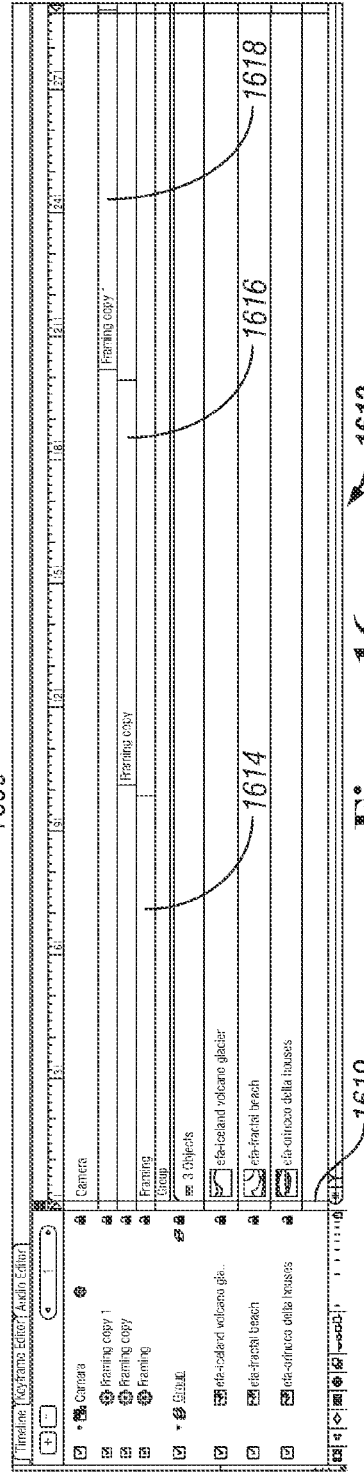
Figure 16

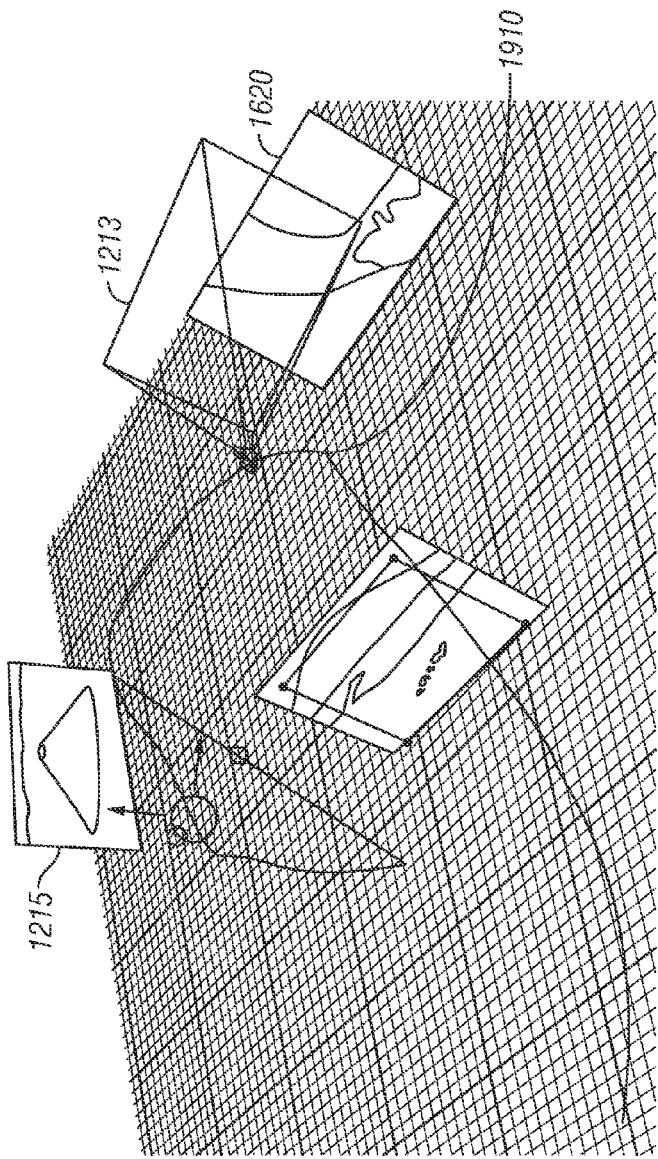
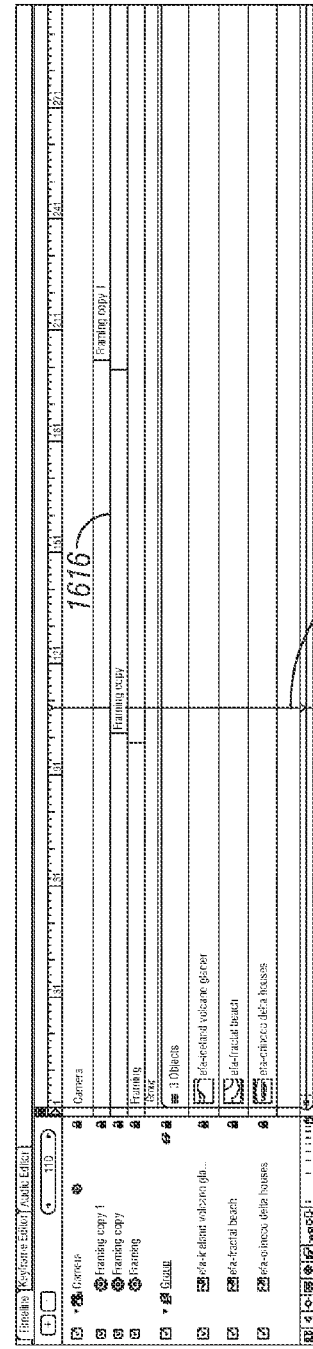
Figure 19

DIRECTING CAMERA BEHAVIOR IN 3-D IMAGING SYSTEM

FIELD OF THE INVENTION

The invention is directed towards compositing images in a simulated space. Specifically, this invention is directed toward a method of simplifying the task of setting up the motions of a simulated camera in a simulated space.

BACKGROUND OF THE INVENTION

Digital graphic design, video editing, and media-editing applications provide designers and artists with the necessary tools to create much of the media seen today through the various media outlets. These tools allow designers the ability to generate, compose, composite, and animate the images and videos in a virtual digital space. In the progression of these tools, the virtual digital space has gone from flat two-dimensional (2D) spaces to three-dimensional (3D) spaces.

A computer simulating the space is also able to calculate an image of the space as seen from a particular point in the three-dimensional space, looking in a particular direction, and with a particular field of view (such a calculation is sometimes called "rendering"). Some applications define a virtual camera at that particular point (the location of the virtual camera), pointing in that particular direction (the orientation of the virtual camera), and spanning that particular field of view. A virtual camera can be moved around the three-dimensional space and re-oriented. When the image of the scene is rendered, objects within the field of view are shown in the rendered image, while objects outside the field of view are not seen in the rendered image.

A 3D space provides designers with capabilities not previously available within a 2D space. Designers now have the ability to fly virtual cameras throughout the 3D space, adding depth to render more complex environments. Also, the added third dimension provides designers with a much larger workspace with which to work. Objects such as images, videos, text, shapes, cameras, lights, spatial audio, etc. can be located anywhere in any dimension of the 3D space Objects in the 3D space of such applications have locations (sometimes called "positions") and orientations (also called "direction") which may change over time. The simulated camera of such applications is generally movable, both in position and orientation. The position, orientation, and field of view of such a camera determines which objects are in the field of view of the camera in the simulated scene and what angles the objects are viewed from. The location determines where the camera is, the orientation represents which way the camera is pointing. Given a location and an orientation (direction the camera is pointing), the field of view determines how much of the scene that surrounds the direction the camera is pointing will be captured by the camera. The wider the field of view, the more of the scene it will capture and the smaller any individual object will appear in the rendered output.

In the prior art, changes in the location, orientation, and field of view of the camera over set durations and the positions and movements of the objects in the scene over such set durations were independent of each other. A camera could be ordered to relocate, but not to relocate over a set duration relative to a particular object. This meant that a user of the prior art had to determine what movements, reorientations and changes of field of view of the camera were necessary to provide whatever views of the objects he wanted, and then program the camera movement accordingly. This left a further layer of complexity to setting up a scene beyond moving the objects, especially since each change in the motion of an object meant that the motion and changes of other camera parameters had to be determined again by the user. Therefore, there is a need for a system that automatically positions a camera relative to a given object and keeps that object framed as the object moves.

SUMMARY OF THE INVENTION

Some embodiments provide a method of allowing a user to associate a simulated camera with one or more objects in a computer generated three-dimensional space for a duration during which the camera will keep the object in its field of view. The computer generated three-dimensional space of some embodiments includes two- and three-dimensional graphical objects (e.g., video clips, images, text, and/or other graphical objects) at various locations in the space. The method can produce a set of images (e.g., a video clip) by rendering the space from a particular field of view at a particular location and orientation. Some embodiments define a virtual camera to represent the particular field of view, location, and orientation from which the space can be rendered. Some embodiments allow one or more of the virtual camera's parameters (i.e., its field of view, location, and/or orientation) to change over time; in other words, some embodiments allow the camera's field of view, position and/or orientation to change over time. Some embodiments provide the use of multiple cameras to produce one or more scenes by capturing one or more renderings from one or more fields of view, locations, and orientations.

In associating a camera with an object, some embodiments allow a duration to be defined during which the camera will keep the object in its field of view. For instance, when an object moves, some embodiments move the camera along with the object in order to keep the object at least partially in the camera's field of view. Also, some embodiments move a camera to keep a particular face of a rotating object at least partially in the camera's field of view. In case a camera is not capturing a particular object before the start of the duration in which it should, some embodiments modify one or more parameters of the camera (e.g., modify its field of view, location, and/or orientation) so that the camera is capturing a desired portion or all of the object at the start of the duration. At each instant in time, a camera's field of view and distance from the object specify how the camera "frames" the object at that instant. In some embodiments, how a camera frames an object in each instant in time during a specified duration can be modified.

Some embodiments allow a camera to be associated with two or more objects at two or more instances in time. In such a situation, the camera keeps one object in its field of view for the duration specified for that object, then moves on to keep the next object in its field of view. When the camera is commanded to frame multiple objects, some embodiments can receive multiple starting times and multiple durations for moving the simulated camera to the multiple objects. When one time setting overlaps with the next time setting, some embodiments generate a compromise path for the simulated camera.

Other embodiments provide other behaviors. For example, some embodiments provide controls that allow a user to assign one or more behaviors to a camera for some duration, and modify any behaviors assigned to the camera. In some embodiments, such behaviors include "dolly" (e.g., move along a set path over the duration), "sweep" (e.g., change the orientation of the camera without changing its position or keep the camera pointing at a particular location in the 3D space as the camera revolves about that point), "zoom" in or out (e.g., narrow or widen the field of view). Some embodiments provide behaviors that associate a camera with an object or a group of objects (like the framing behavior described above). For example, a "dolly zoom" comprises moving the camera while changing the focus of the camera such that a particular object or group of objects stays the same apparent size in the field of view while other objects behind it appear to change size.

BRIEF DESCRIPTION OF THE DRAWINGS

The novel features of the invention are set forth in the appended claims. However, for purpose of explanation, several embodiments of the invention are set forth in the following figures.

FIGS. 6a-6d illustrate multiple renderings of the same set of objects from multiple locations, orientations, and fields of view as time within the scene passes.

FIGS. 16-21 illustrate the framing of multiple objects.

DETAILED DESCRIPTION OF THE INVENTION

In the following description, numerous details are set forth for purpose of explanation. However, one of ordinary skill in the art will realize that the invention may be practiced without the use of these specific details. For instance, the techniques described below are described in a specified order, but other embodiments may change the order of the operations while still embodying the current invention.

I. Overview

Some embodiments provide a video compositing application. Such an application provides tools (e.g. graphical user interface tools) to allow a user to command that application to set up and make a composite media clip of one or more images, sounds, video clips, or other two- and three-dimensional graphical objects (e.g., video clips, images, text, and/or other graphical objects) at various locations. The applications of some embodiments provide tools that allow a user to apply a behavior to a camera, e.g. to associate a simulated camera with one or more objects in a computer generated three-dimensional space. Section IV below describes several exemplary behaviors.

Figure 1:
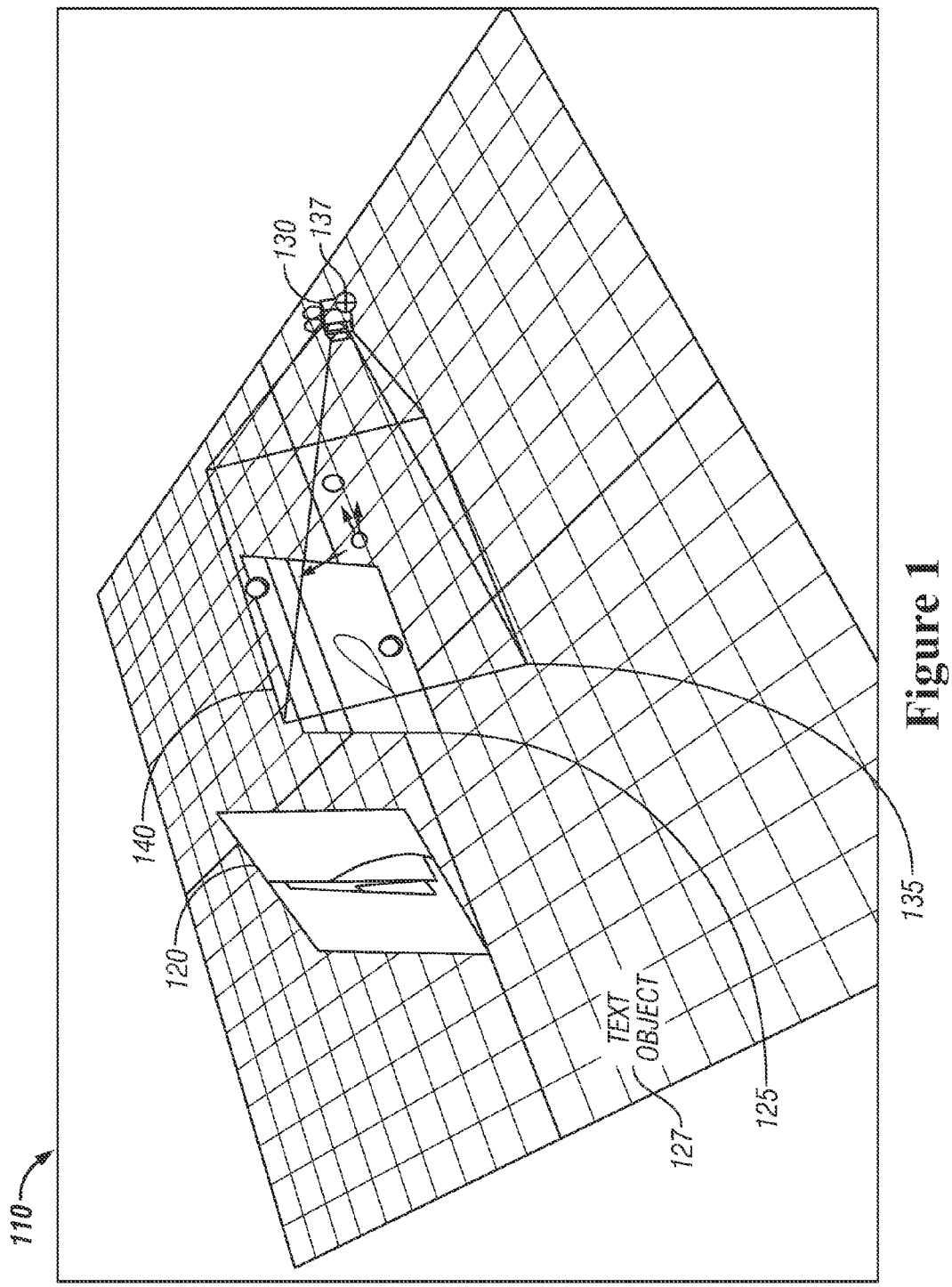
FIG. 1 illustrates a view of an active workspace window 110 of a 3D space within a 3D editing application.

FIG. 1 illustrates an example of one such computer generated three-dimensional space. This figure shows a computer generated three-dimensional space 110 that includes an image 120, a video clip 125, and a text object 127. It also includes a virtual camera 130, which represents a field of view (illustrated by field of view indicator 135), a location 137, and an orientation from which a video clip of the scene can be rendered. For illustrative purposes, FIG. 1 shows the field of view indicator 135 as a wireframe that spreads out from the camera 130 for a distance 140, even though the field of view extends to the boundaries of the space. In some embodiments, objects in the same plane as the end of the wireframe will be rendered in proportion to their relative size in the wireframe. In the example illustrated in FIG. 1, the field of view captures the video clip 125. Hence, the video clip rendered from the field of view, the location 137, and the orientation represented by camera 130 would show the video clip 125 for a duration of time (assuming that image stays in the field of view during the duration of time). The rendered video clip would also show any other objects that fall within the camera's field of view.

Some embodiments allow one or more of the virtual camera's parameters, i.e., its field of view (sometimes called "angle of view"), location (sometimes called "translation"), and/or orientation (in some embodiments orientation comprises the amount of rotation of an object with respect to a reference axis, accordingly, orientation is sometimes called "rotation") to change over time; in other words, some embodiments allow the camera's field of view, position and orientation to change over time. Some embodiments provide the use of multiple cameras to produce one or more scenes by capturing one or more renderings from one or more fields of view, locations and orientations.

In associating a camera with an object, some embodiments allow a duration to be defined during which the camera will keep the object in its field of view. For instance, when an object moves, some embodiments move the camera along with the object in order to keep the object at least partially in the camera's field of view. Also, some embodiments move a camera to keep a particular face of a rotating object at least partially in the camera's field of view. In case a camera is not capturing a particular object before the start of the duration in which it should, some embodiments modify one or more parameters of the camera (e.g., modify its field of view, location, and/or orientation) so that the camera is capturing a desired portion or all of the object at the start of the duration. At each instant in time, a camera's field of view and distance from the object specify how the camera "frames" the object at that instant. In some embodiments, how a camera frames an object in each instant in time during a specified duration can be modified.

Some embodiments allow a camera to be associated with two or more objects at two or more instances in time. In such a situation, the camera keeps one object in its field of view for the duration specified for that object, then moves on to keep the next object in its field of view. When the camera is commanded to frame multiple objects, some embodiments can receive multiple starting times and multiple durations for moving the simulated camera to the multiple objects. When one time setting overlaps with the next time setting, some embodiments generate a compromise path for the simulated camera. In some embodiments, this compromise path starts out very close to the earlier path and then gradually shifts to the later path.

Figure 2:
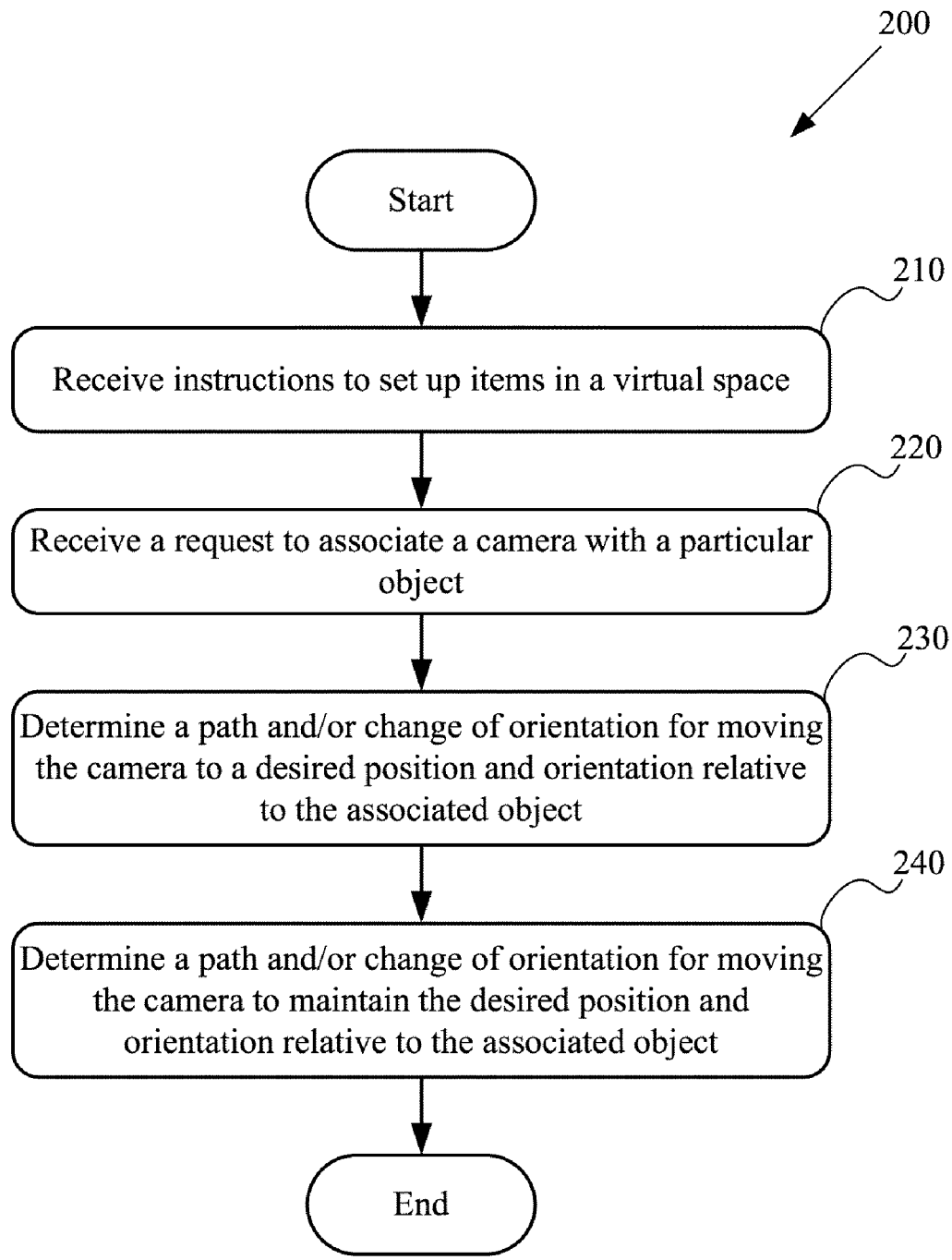
FIG. 2 illustrates a process of some embodiments for associating a virtual camera with a virtual object.

FIG. 2 illustrates the process 200 of some embodiments for associating a camera with an object. In some embodiments, a video compositing application performs the process. Such an application allows a user to set up a scene (also called a 3D project) in a simulated space (also called a virtual space). The process allows a user to associate a camera with one or more objects in that scene for a specified duration. The application then (if necessary) moves the camera to the associated object(s) and (if the objects move after the camera gets to the object) keeps moving the camera so as to keep the object(s) in the camera's field of view for the specified duration.

The process 200 (at 210) allows a user to build scenes by placing items in a three-dimensional space. Items in some embodiments include anything that can be added to a scene, e.g. objects, cameras, lights, filters, etc. In some embodiments, these items can be given orders to move and/or rotate as the scene progresses.

Once objects have been placed in the scene, the process 200 receives (at 220) an order to associate the camera with a particular simulated object in the virtual space for some user-definable duration. In some embodiments, when a scene is rendered, the parameters defining the camera change in order to move the camera to a desired position, orientation, and field of view relative to the object and maintain that position, orientation, and field of view relative to the object. In some embodiments, the application allows a user to determine what position, orientation, and field of view relative to the object is desired, sometimes called "framing". See, section III below.

Once a camera has been associated with an object, the process 200 (at 230) determines how to move the camera to the desired location and orientation relative to the object. In some embodiments, the way to move the camera to the object is determined by the application. In some embodiments, the way to move the camera to the object is determined by the user, and in some embodiments, the application generates a path that a user can then edit. In some embodiments, the user also provides a duration for moving the camera to the object. For example, the camera can be set to move so that the field of view goes in ten seconds from an initial position and orientation to one in which the object fills the field of view and appears head on to the camera.

If the associated object is programmed to move during the user-defined duration in which the camera is framing it, the process 200 also determines (at 240) how to move the camera in order to keep the camera in the desired position and orientation relative to the object for the user-defined duration. In some embodiments, the camera is kept in the desired position and orientation relative to the object by moving and/or rotating in a different frame of reference.

Many features of the camera control system of some embodiments are described in the sections below. A description of an exemplary 3D compositing application is provided in section II below. Section III describes framing. Section IV describes other behaviors provided by some embodiments. Section V describes a computer system of some embodiments for running the 3D simulation application of some embodiments.

II. 3D Compositing Application

A. Exemplary Application

Figure 3:
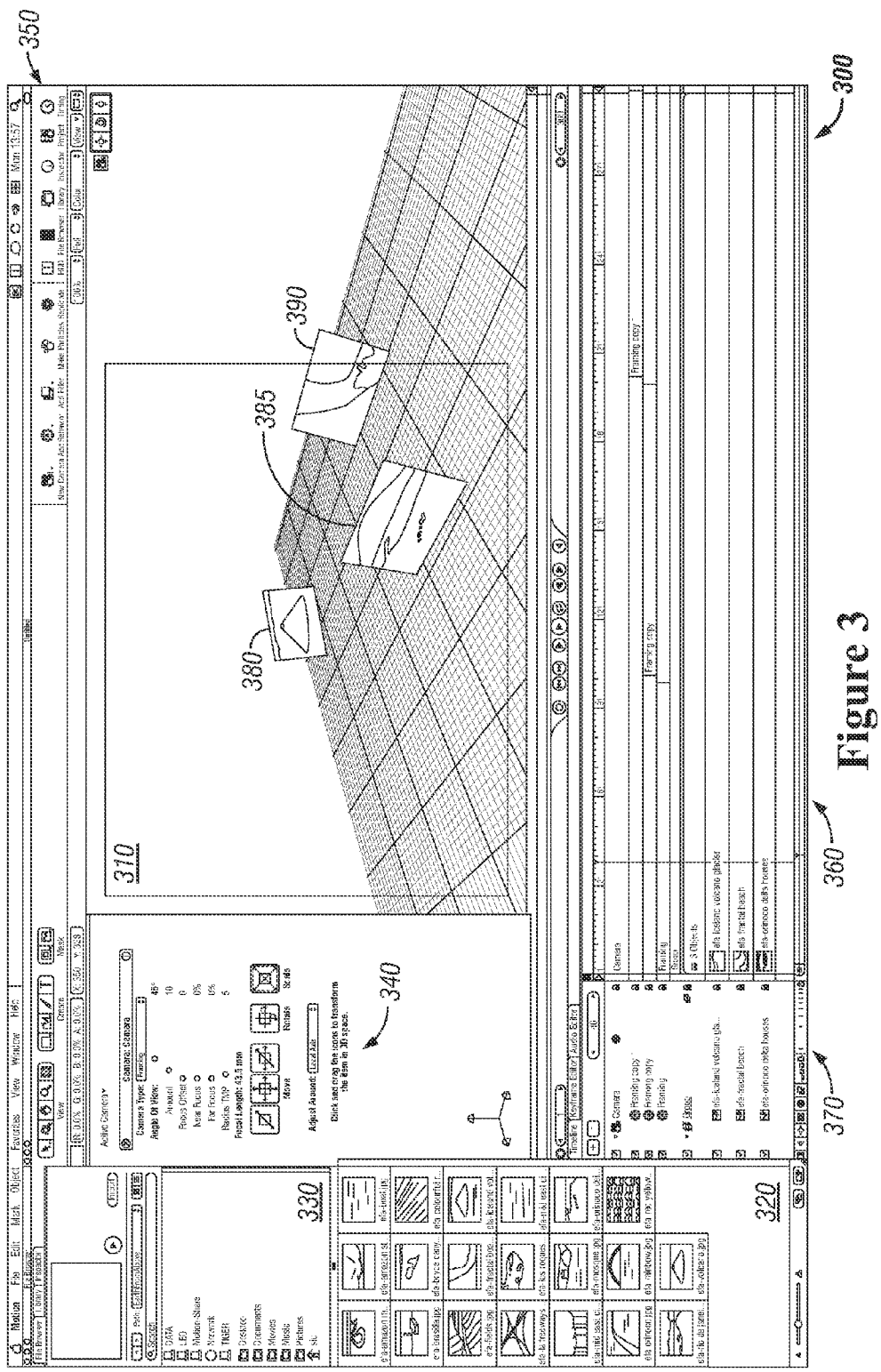
FIG. 3 illustrates an example of a 3D simulation application of some embodiments.

FIG. 3 illustrates an example of a 3D compositing application of some embodiments. The 3D compositing application 300 provides (1) a main display window 310, (2) an object selection area 320, (3) a file browser area 330, (4) a camera control panel 340, (5) a set of control icons 350, (6) a timeline display area 360 and a timeline control area 370. In FIG. 3, the main display window 310 is displaying objects 380, 385, and 390.

Figure 4:
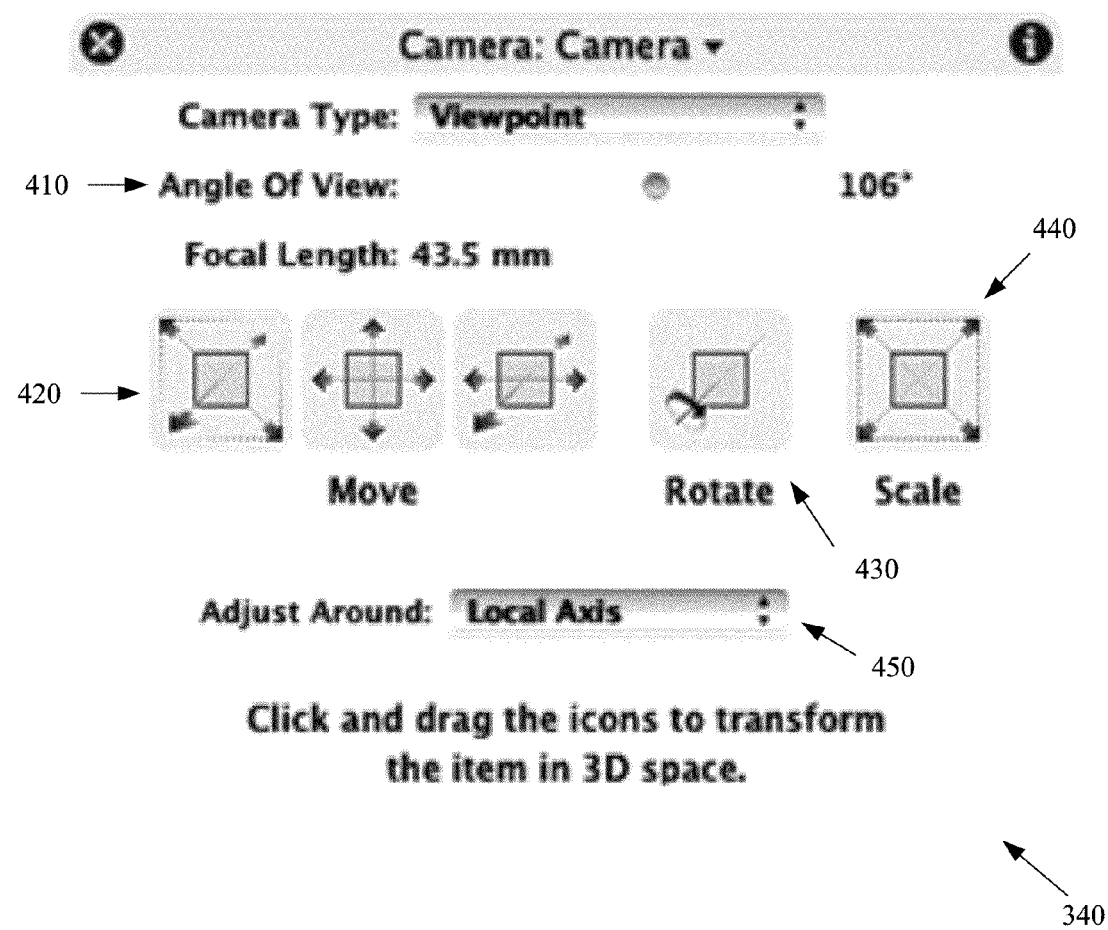
FIG. 4 illustrates a camera control panel.

The application allows a user to add a new camera, new object, new behavior, or a new filter using control icons 350. The application allows a user to control an existing camera using the camera control panel 340, illustrated in more detail in FIG. 4. The camera control panel 340 has various controls, including an angle of view control 410 that controls the field of view of the camera, controls 420 for relocating the camera in the 3D space, controls 430 for rotating the camera, and controls 440 for resealing the field of view of the camera.

The control panel also includes a selection box 450 for determining what set of coordinates the adjustments of the camera will be adjusted in relation to. For example, the camera of some embodiments has its own internal coordinate system that has one axis in the direction that he camera is looking, one axis that defines the direction of the top of an image in that frame (e.g. the "up" axis of the camera), and a third axis at right angles to those (e.g., directed to one side of the image). Some embodiments also have a global frame of reference. In some embodiments, the global "up" axis is in the direction of the top of the display area for the three-dimensional space. If the up-axis of the camera is not aligned with a global up-axis (e.g. camera is pointing down at an angle) and the camera is told to rotate around the up axis, it will rotate around the up-axis of the camera if the local axis (local meaning in the camera's coordinate system) is selected in selection box 450 and around an axis parallel to the global up-axis of the scene if the global axis is selected in selection box 450.

Figure 5:
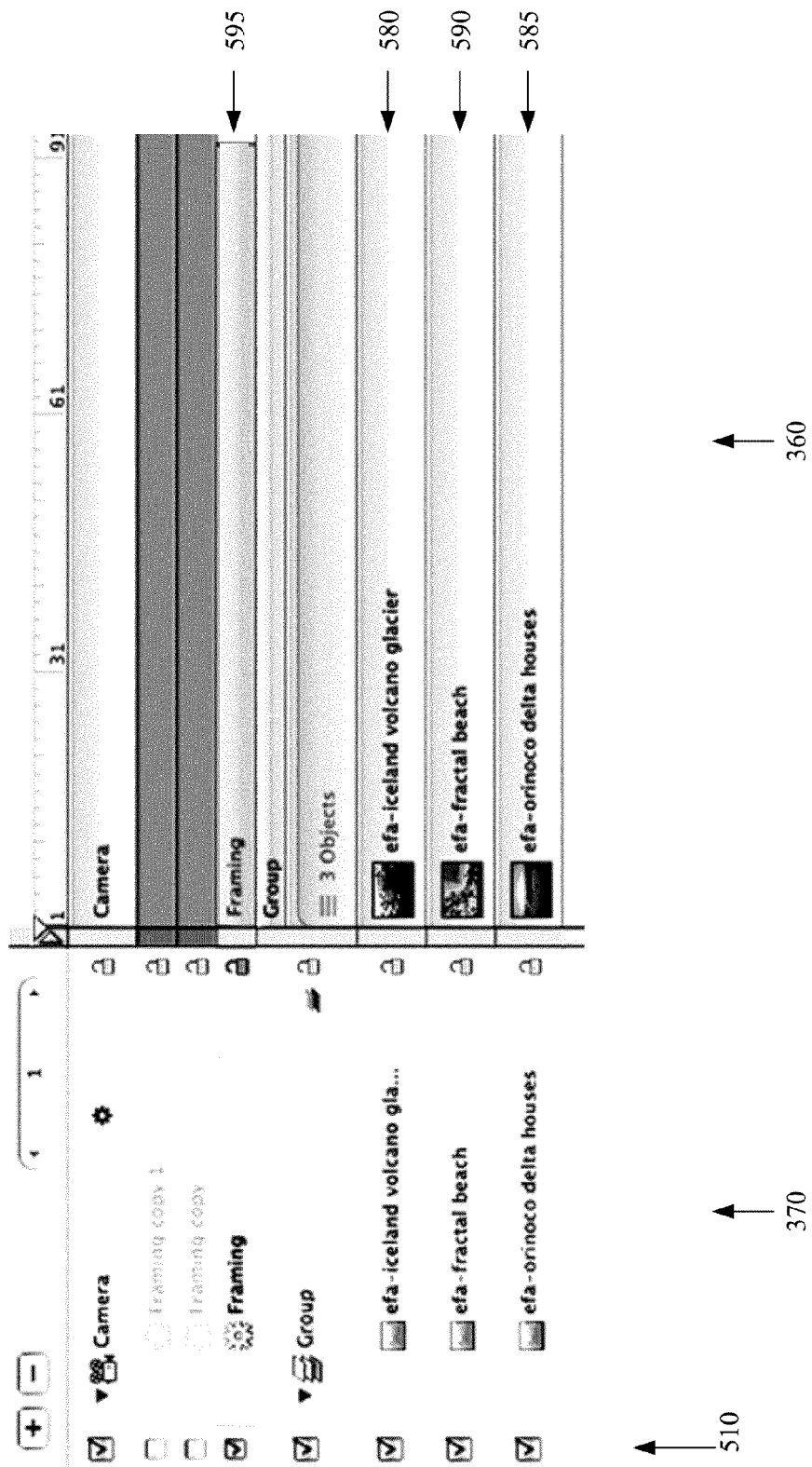
FIG. 5 illustrates a timeline and timeline controls.

FIG. 5 illustrates timeline 360 and timeline controls 370. The controls include checkboxes 510 for setting whether particular objects will be active in the scene, these check boxes allow objects to be temporarily deactivated for various reasons without deleting them and losing any existing configurations of the object and their set behaviors. The timeline 360 includes object timelines 580, 585, and 590, representing, respectively, the presence of objects 380, 385 and 390 (as shown in FIG. 3) in the scene. The timeline 360 also includes a camera timeline 595 for a camera with a framing behavior (see section III below).

In some embodiments, different frames of a scene can be viewed in the 3D simulated environment of the exemplary application by selecting a particular frame on the timeline 360. Such scenes can be "played out", in the setup screen by showing the state of the setup scene during various scene frames in rapid succession. The 3D environment of some embodiments uses "simple" versions of more complex objects, the equivalent of using thumbnails to organize a collection of large images. The simple versions of such embodiments have low processor demand (e.g. with low detail, low resolution, low or no special effects, no shadows or sharp shadows, etc.). This allows changes to the scene to be viewed with minimal delay. In some embodiments, a scene can include multiple objects, cameras, light sources, and anything else that is within the 3D simulated environment. In other embodiments, the scene is laid out using full quality versions of the objects.

The exemplary application provides tools so that a user can set various behaviors (e.g., move left) for items in the scene and can view the scene using the simple versions while determining the best positions, orientations, and movements of the items (such as the objects 120-127 of FIG. 1). Objects and cameras can change their orientation in space, and move from one location to another. Objects and cameras can also simultaneously move to different positions and rotate.

Once a user is satisfied with the scene laid out using the simplified (or in some embodiments, full quality) objects, the exemplary application allows a user to use a virtual camera to render a video clip of the scene (in some embodiments, this is done one frame at a time). The rendering process comprises determining the locations of the objects as they go through their set behaviors and using a virtual camera to create a "camera's eye" view of the scene as it plays out. The camera's eye view uses the complex objects that the simple versions of the objects represent. See, subsection II.B. below for further description of rendering a scene from different locations, orientations, and fields of view.

In some embodiments, rendering a frame can be very complicated, as it may involve calculating not just the direct appearance of objects in the camera's immediate field of view, but also items that affect how the objects in the field of view look. For example, if the objects have reflective or refractive surfaces, then objects that are not within the camera's direct field of view may be reflected or refracted in a way that changes what a camera would "see". Similarly, in some embodiments, light sources outside of the camera's field of view and shadows of off camera objects, can affect the color or visibility of objects in the camera's direct field of view. Some embodiments may even simulate lens flare, which is affected by bright objects in the field of view.

Because of the high computer processing time required by such complications, some embodiments allow rendering at various levels of detail, such as lower or higher detail, (e.g. with or without reflections, refractions, shadows, etc., and/or skipping specified fraction of the frames, etc.) for faster or slower renderings. Though in some embodiments, even a low detail rendering is more detailed than the main display window.

B. Rendering from a Position, Orientation, and Field of View

As described above, the video compositing application of some embodiments renders a scene from some particular position, orientation, and field of view that may change as time passes within a scene. FIGS. 6a-6d illustrate multiple renderings of the same set of objects from multiple positions, orientations, and fields of view as time passes in a scene. At the top of each of FIGS. 6a-6d, is a stylized view of a three-dimensional space as viewed from above. At the bottom of each of FIGS. 6a-6d, is a stylized view of a rendered image of the scene (e.g. a calculated representation of the objects) from the position, orientation, and field of view represented by the camera in the scene above.

Figure 6B:
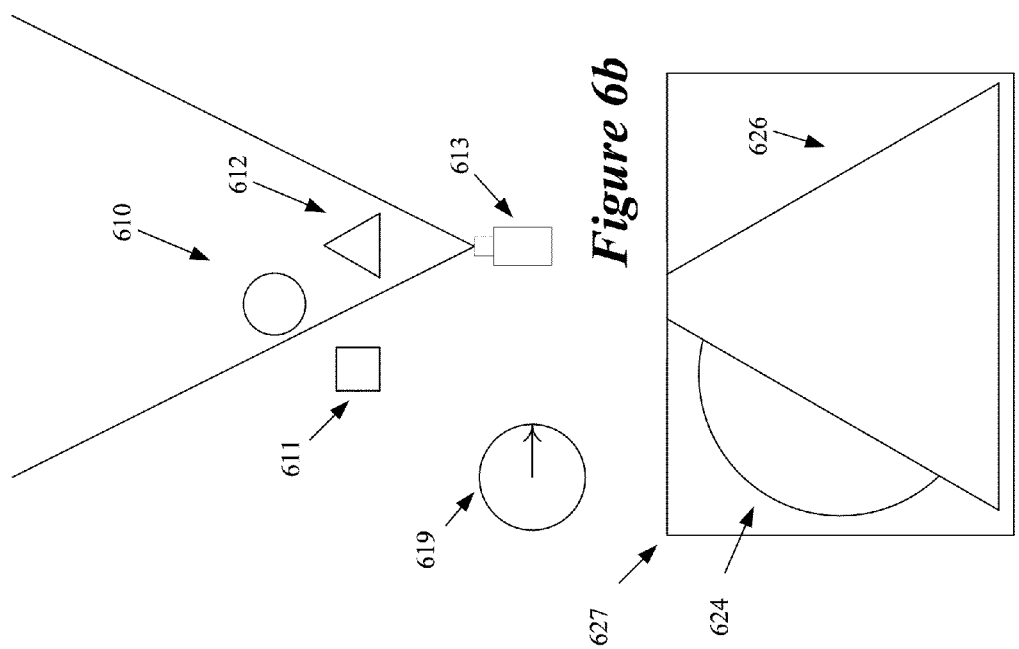
Figure 6A:
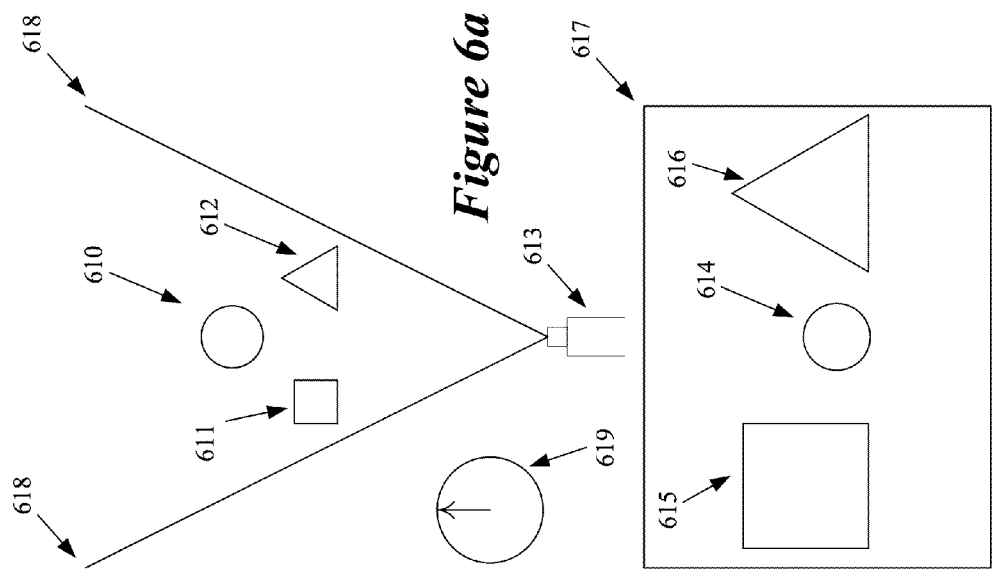

In FIG. 6a, simulated objects 610-612 are within the simulated space and are within the field of view of simulated camera 613. Images 614-616 of, respectively, objects 610-612 are shown in rendered screen 617. The images 614-616 of objects 610-612 are visible in rendered scene 617 because objects 610-612 lie within the field of view of the camera as indicated by view lines 618. Images 614-616 are positioned from left to right in the same order as they would appear to someone looking at objects arranged in that manner from the location of the camera 613. Image 614 is smaller in proportion to images 615 and 616 than object 610 is in proportion to objects 611 and 612 because of perspective. In other words, because object 610 is farther from the camera than objects 611 and 612, the rendered image 614 appears smaller (change in proportions exaggerated for effect). The time within the scene is shown in clock 619.

FIG. 6b shows the simulated space at a later time within the scene, as shown in clock 619. At that time, object 611 is no longer within the field of view of the camera 613. Object 612 fills most of the field of view, with object 610 partly visible to the camera on the left of object 612. This is shown in rendered scene 627. In the rendered scene, image 624 (based on object 610) peeks out to the left of image 626 (based on object 612).

FIG. 6c shows the simulated space at an even later time within the scene, as shown in clock 619. At that time, camera 613 has moved to the upper right of the scene, and re-oriented to point at objects 610-612 from a different direction.

The order of the images 634-636 in rendered scene 637 is rearranged from the order in rendered scene 617 in accord with changes to the position, orientation, and/or field of view of the camera.

FIG. 6d shows the simulated space at an even later time within the scene, shown in clock 619. At that time, the field of view has narrowed, as indicated by view lines 648. Because of the narrowed angle of focus, object 612 is no longer in the field of view of camera 613. Because of the narrowed field of view, objects 610 and 611 fill a larger fraction of the camera's field of view, as indicated by the large images 644 and 645 in rendered scene 647.

III. Framing

A. Framing an Object

Some embodiments provide controls for setting up a camera behavior that associates the camera with a particular object and "frames" that object (not to be confused with a frame of video). A camera of some embodiments can be positioned anywhere and a rendered scene will show any objects in its field of view (that are not blocked by other objects), regardless of the orientation of the camera and the object. However, a user may want to have a particular object "framed" by the camera (e.g. filmed from a designated "front", filling a specified portion of the field and "right-side-up").

Figure 7:
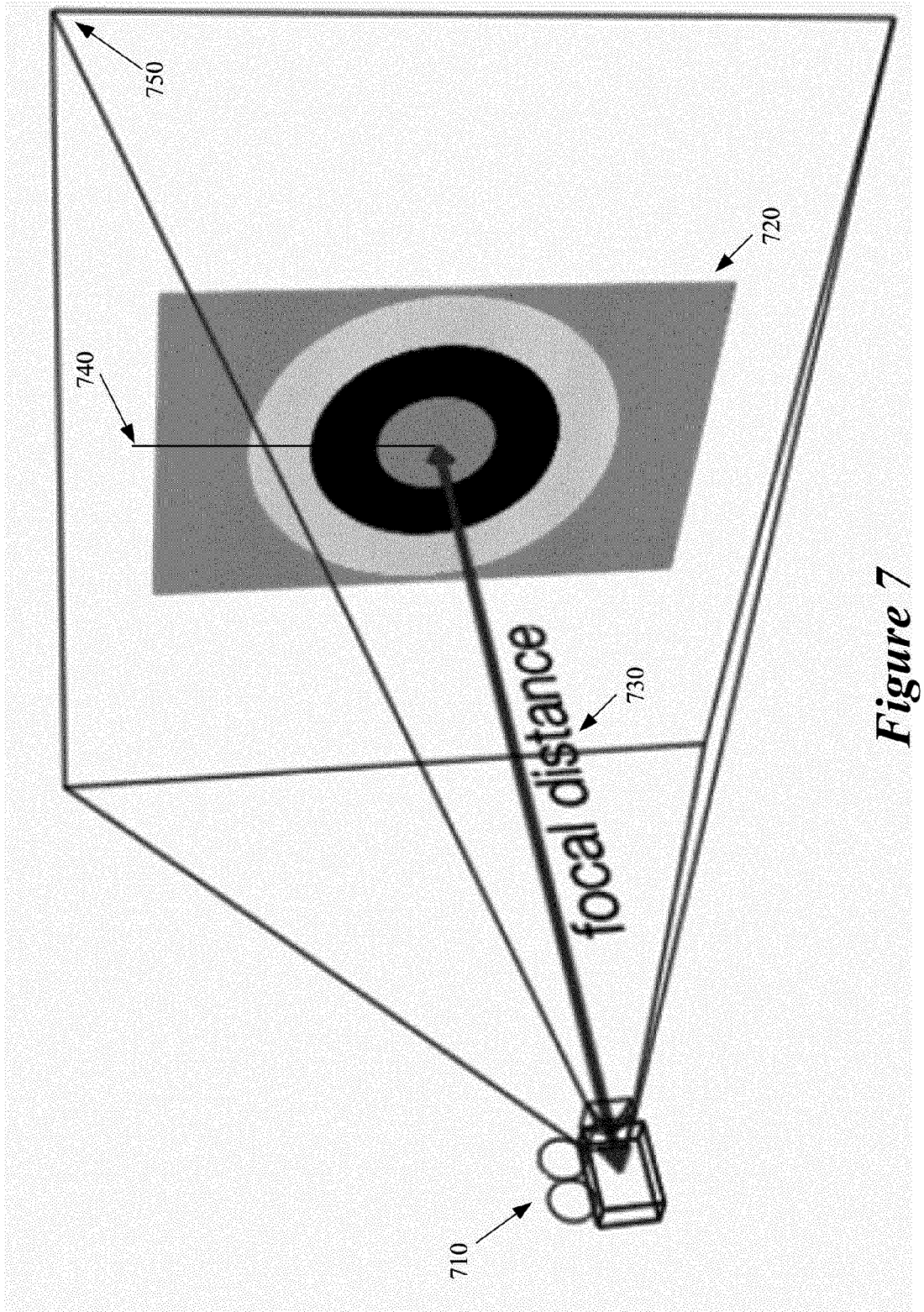
FIG. 7 illustrates camera framing.

FIG. 7 illustrates framing of some embodiments. A camera 710 frames an object 720, when the camera 710 is (1) pointed at the object 720, (2) is the correct distance 730 away from the object 720 so that the object fills a specified portion of the field of view, (3) has the top of the camera 710 aligned parallel to a specified direction 740, and (4) is positioned along another specified direction from the object.

In some embodiments, the specified directions are specified relative to the object (e.g. along an axis of the object or in a direction defined relative to the axes of the object). In some embodiments, the specified directions are defined relative to another object, a group of objects, or a global coordinate system of the 3D space. In some embodiments, when the scene is rendered, the end of the framing box (sometimes called a "camera frustum") 750 represents the size and orientation of a computer monitor on which the rendered scene will be displayed, and the specified portion of the field of view is large enough to fit the whole object (or the whole width or whole height of the object) on the monitor.

Figure 8:
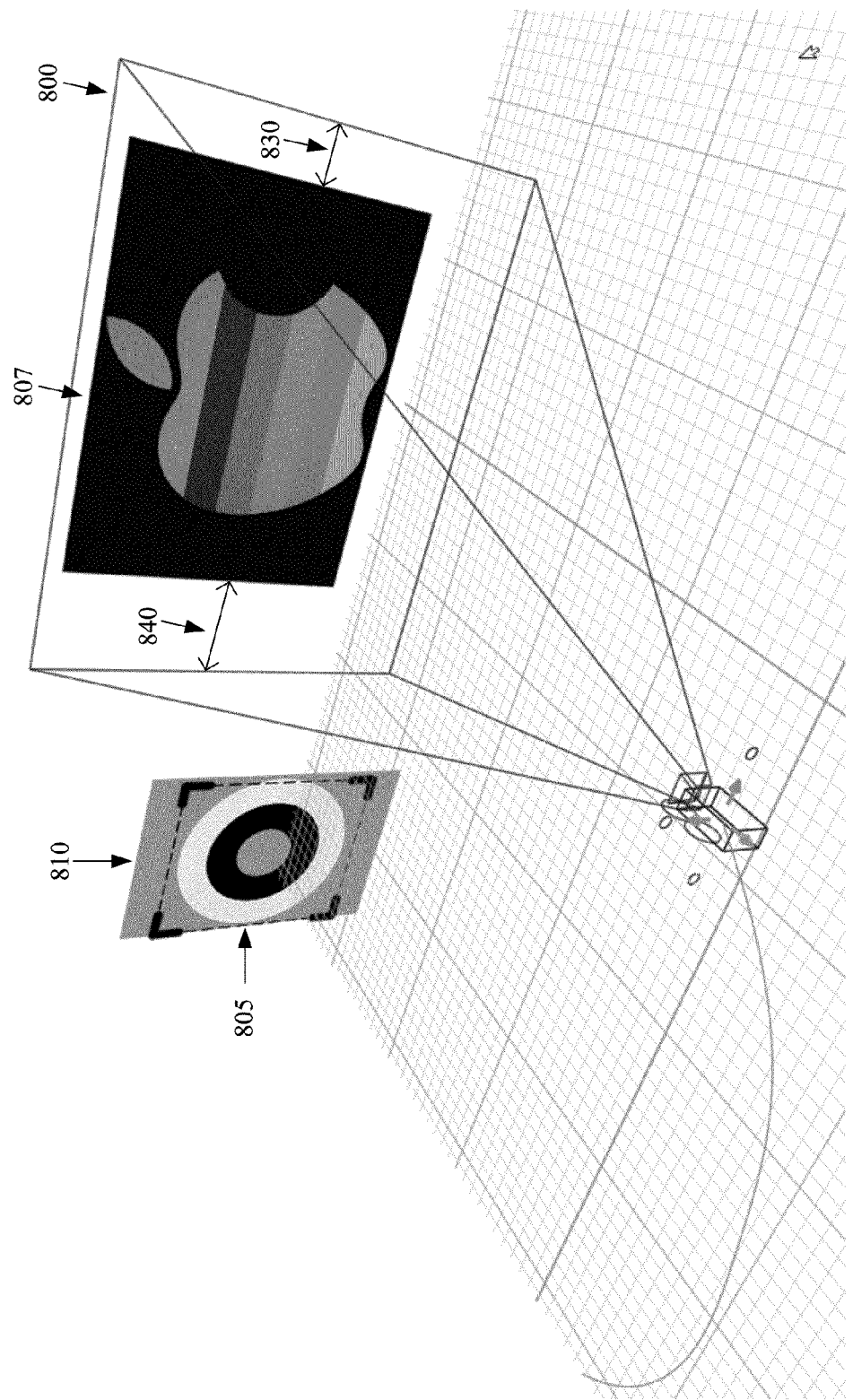
FIG. 8 illustrates a tool of some embodiments for setting a framing offset.

In some embodiments, the framing of an object can be offset in a specified direction and by a specified amount. FIG. 8 illustrates a tool of some embodiments for setting a framing offset. The figure illustrates framing box 800 and framing offset controller 810. Framing offset controller 810 includes a target 805 representing the object 807 to be framed and the surrounding area. The target is framed by a dotted line representing the position of the camera's frame on the object 807. The dotted line infringes on the right side of the target but not the left side, indicating that the object will be framed in such a way that the right side of the object 807 will be closer to the edge of the field of view than the left side of the object. In accord with the framing offset controller 810, the framing box 800 is offset so that the distance 830 between the framing box 800 and the right side of the object 807 is shorter than the distance 840 from the framing box 800 to the right side of the object 807. Some embodiments move and orient the camera to automatically frame a specified object, as described below.

Some embodiments allow offsets in different directions. A forward offset would be a close-up of the object. A backward offset would allow the background to be seen around the object. A sideways offset could be used to place a targeted object in the foreground and have objects in the background visible on one side of the object. In film or television, such a technique might be used when an actor and events he is looking at need to be in the same shot. The actor is on one side of the screen and is looking at events on the other side of the screen and further from the camera than the actor.

B. Automatic Framing

The application of some embodiments contains various controls to (1) allow the user to define a camera behavior that targets an object for framing and (2) set a duration of that camera behavior. The framing behavior commands the camera to go to and frame a target object over the designated duration. Some embodiments receive the designation of the object and the duration for framing the object using separate controls. Some embodiments provide specialized camera framing controls, as described in subsection III.E. below.

Some embodiments provide a display of a three-dimensional space that shows what path a camera (or what path the center of the camera's frame of view) will take through that space over time. Some such embodiments recalculate the path in the displays when a new framing behavior is added to the camera. Some embodiments recalculate the path when an existing framing behavior is changed. Some embodiments recalculate the path when movements (or other parameter changes) of the target object during the specified duration affect the way the camera will implement the given behavior (e.g. when the position of the target object, at a given instant in the duration, changes that affects where the behavior will send the camera, even though the behavior itself is unchanged).

Figure 9:
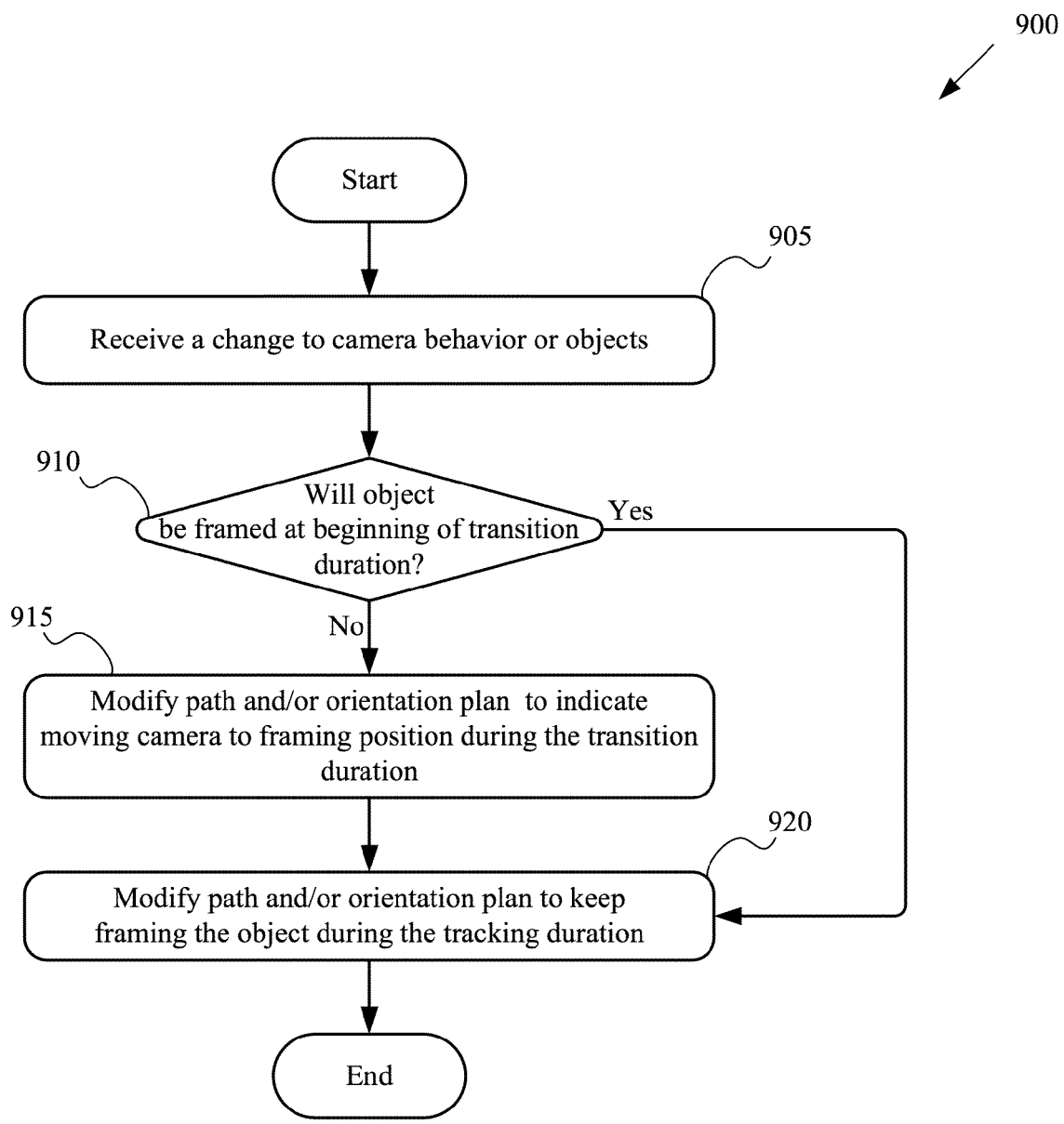
FIG. 9 illustrates the framing process of some embodiments.

In some embodiments, after an application has received a change that would affect the camera's path, the application recalculates the path of the camera. The application generates a new path for the camera to take to implement its framing behaviors. FIG. 9 illustrates the process 900 of some embodiments for such path generation. At 905, the process 900 receives a change of framing behavior of the camera, or a change that (during the specified duration) affects the positions and/or orientations of objects that the camera behavior targets.

The process 900 (at 910) determines whether the current path of the camera already specifies that the camera will be in a position and orientation to frame the object as of the beginning of the designated duration. If the current path already specifies that the object will be in a position and orientation to frame the object at the beginning of the specified duration then the process 900 (at 920) calculates a path that indicates that the camera will continue to frame the object for the duration of the designated time. If the object isn't set to move, reorient, or change size during the designated time, the calculated path simply indicates that the camera will stay in the same position, otherwise, the process 900 (at 920) will generate a new path that indicates that the camera will move to keep the object framed. And will send the process 900 to operation 930

If the process (at 910) determines that the object will not be framed at the beginning of the designated time period, given the existing path, then (at 915) it calculates a path that indicates that the camera will move to the location of the targeted object (that is, the location the object will be when the camera reaches it) and calculates a plan to rotate the camera to face the associated object. In some embodiments, this path can be altered in various ways as described in subsection III.G., below.

The path does not necessarily end at the point in time that the object is framed. If the object is set to move or rotates after the camera begins framing it, then the process 900 (at 920) calculates a path and/or orientation plan that indicates that the camera will move with the object until the end of the duration. Some embodiments allow the duration for framing the object to be adjusted, either as a fraction of the total behavior time or in absolute terms. Adjusting the time for tracking the object is further described in section III.E., below.

One of ordinary skill in the art will realize that the order of determining the paths and orientations may be different in different embodiments. For example, in some embodiments, the paths and orientation plans for the camera are worked out essentially simultaneously, while in others they are calculated separately.

Once a scene (with or without behaviors) is set up the application can render the scene. In some embodiments, the application can show an animation of the scene that provides the user with an outside view of how the camera will move and turn as the scene plays out, rather than a camera's eye view. Such outside views are illustrated in the figures described in subsection III.G., below to demonstrate the effect of various parameters on the motion of a camera of some embodiments.

In some embodiments, the application uses the path calculated by the process 900 to determine the positions and locations of the camera during rendering. In other embodiments, the path calculated by process 900 is used for showing the user where the camera will go and where it will point during the scene, but the motions of the camera during rendering are calculated while the rendering is happening, rather than pre-calculated. Calculations during rendering are described in subsection III.C. below.

In some embodiments, the application receives a request to evaluate the position and orientation of a camera and interpolates a position and orientation for the camera between its current location and orientation, and the position and orientation required to frame the target.

C. Calculating Camera Parameters During Rendering

Figure 10:
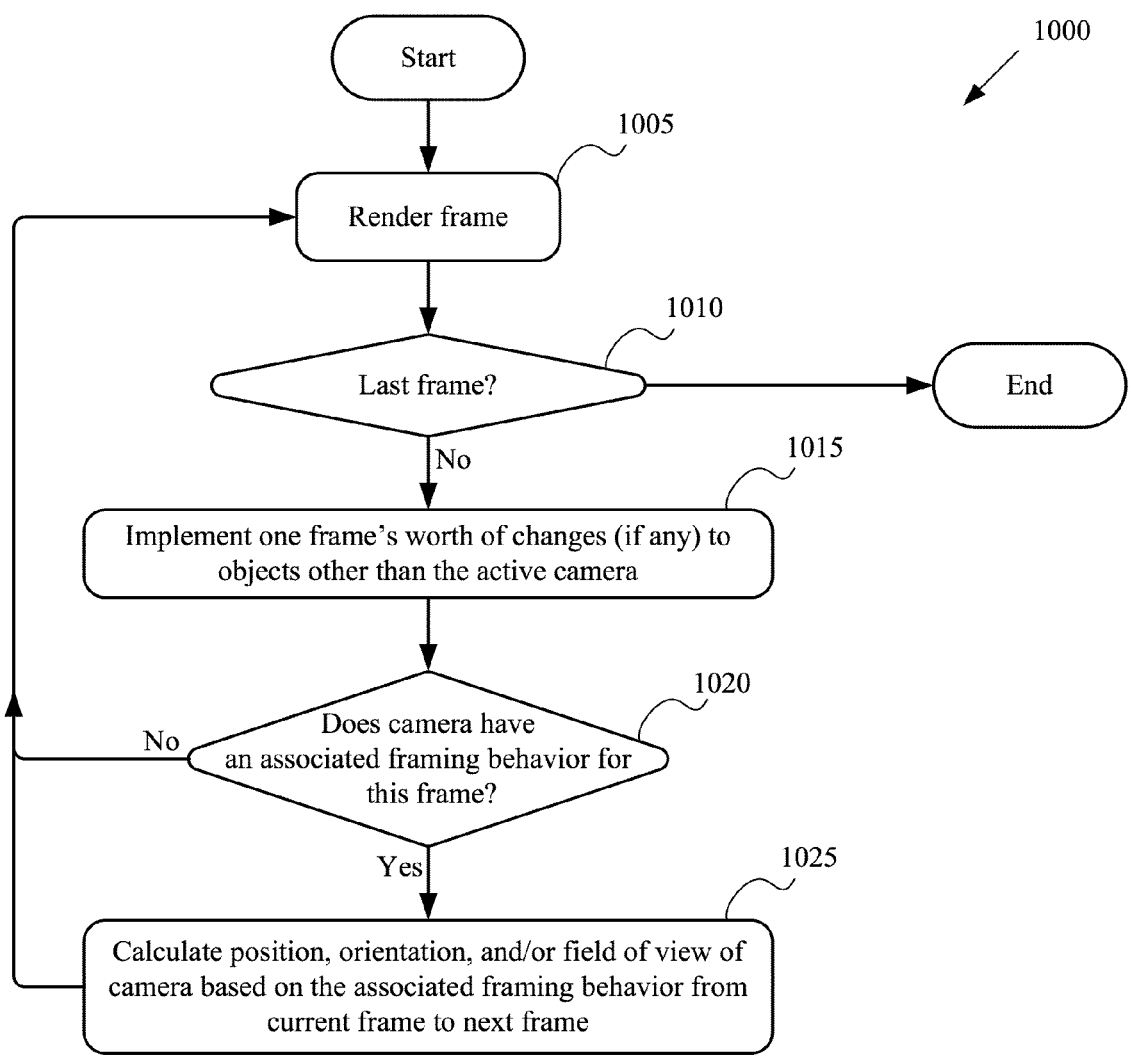
FIG. 10 illustrates a process of some embodiments for implementing a framing behavior while rendering a scene.

FIG. 10 illustrates the process 1000 of implementing a framing behavior while rendering a scene. Process 1000 (at 1005) renders a frame using the capture parameters of the camera (e.g. position, orientation, and field of view). The rendered frame is a calculation of how the objects in the camera's field of view would appear to a camera with those parameters. The rendered frame includes images of the graphical objects within the field of view of the camera as of that point in a timeline of the scene. In some embodiments, the images (of the objects) in the rendered frame are scaled in proportion to the portion of the field of view they intercept and are skewed from their original appearance in accord with the angle between the camera's orientation and the object's orientation. In some embodiments, rendering entails creating a two-dimensional representation of a set of 2D or 3D objects, in some embodiments, with respect to lighting and various atmospheric and other effects, at a point in time from a particular point of view at a specified width and height.

If (at 1010) the rendered frame is the last frame, then the process ends. If (at 1010) the rendered frame is not the last frame, then the process 1000 (at 1015) implements one frame's worth of changes to any objects (that need changing) in the scene other than the camera. In other words it calculates the updated position and orientation of the camera with respect to any behaviors and associated objects for the next time increment (for example for the next 1;30th of a second of the video clip). For example, if an object is set to move, then the position of the object is changed by the amount that it is supposed to move from the instant on the timeline that the rendered frame represents to the instant on the timeline that the next frame to be rendered represents. If the camera has no framing behavior associated with it (at 1020) at that instant on the timeline, then the process 1000 loops back to 1005 and renders the next frame without changing the camera's parameters.

If the camera has a framing behavior associated with it at that instant on the timeline, then the process 1000 (at 1025) calculates the position, orientation, and field of view of the camera for the next frame in the timeline. The calculation is based on the framing behavior of the camera. Further descriptions of the calculations of some embodiments are in subsection III.D., below. In some cases, such as when the camera is already framing the object that the camera is associated with and the object does not move from the rendered frame to the next frame to be rendered, the framing behavior will not change any parameters of the camera. In some embodiments, framing behavior changes the field of view of a camera. In other embodiments, framing behavior changes the location and orientation, but does not change the frame of view of the camera.

D. Calculations of Framing Behavior

In some embodiments, the position and orientation of each object and camera can be represented by a 4×4 matrix that expresses the object's location and rotation in 'world space' which is a shared co-ordinate system for all objects in a 3D scene. Since each object in the scene has its own position and orientation, each object can be thought of as having its own co-ordinate system, and the 4×4 matrix for each object not only expresses that information, but also allows transformations from the object's coordinate system into world space and back into the object's local space via the inverse matrix. In order to calculate relative positions and orientations of different objects in a 3D scene, it is necessary to transform each object so that it is in the same coordinate system as the other object(s).

In some embodiments, calculating the location of a target object relative to the camera requires the transformation of the target object's position and orientation into the camera's coordinate system before calculating the distance the camera has to move in order to frame the target object and the required orientation change for the camera so that it faces the target object.

In some embodiments, during the period of transition of the camera from its original location and orientation to the location and orientation where it is tracking (or framing) the target object, the position and orientation can be calculated by linearly interpolating between the original position and the tracking position, and spherically interpolating the orientation between the original orientation and the orientation required at that position and time to frame the target object. In some embodiments, the interpolation amount can be derived from the ratio of the time elapsed within the transition and the duration of the transition period.

In some embodiments, this interpolation insulates the camera from large changes in the position and orientation of the object. In such embodiments, the position of the camera and the orientation of the camera at the end of the transition duration (and hence the beginning of the tracking duration) is known before the camera starts to move. Accordingly, the camera smoothly moves and reorients to reach that position, with any major changes in the position or orientation of the object during any particular consecutive frames already accounted for in the smooth movement and reorientation of the camera.

In contrast, in some embodiments, during the period that the camera is tracking the target object, its position and orientation can be solely determined by the position and orientation calculated that will make the target object appear at the desired size and position within the frame of the camera.

In other words, in some embodiments, for each frame of the tracking duration the camera will be automatically set, based on the framing behavior, to be in whatever position and orientation are necessary to maintain the object in frame, regardless of how large a change in position and orientation of the camera that requires.

In some embodiments, some or all of the calculations described during the transition and tracking durations would require the transformations mentioned before to compute the relative position and orientation of the camera and target.

E. Framing Controls

Figure 11:
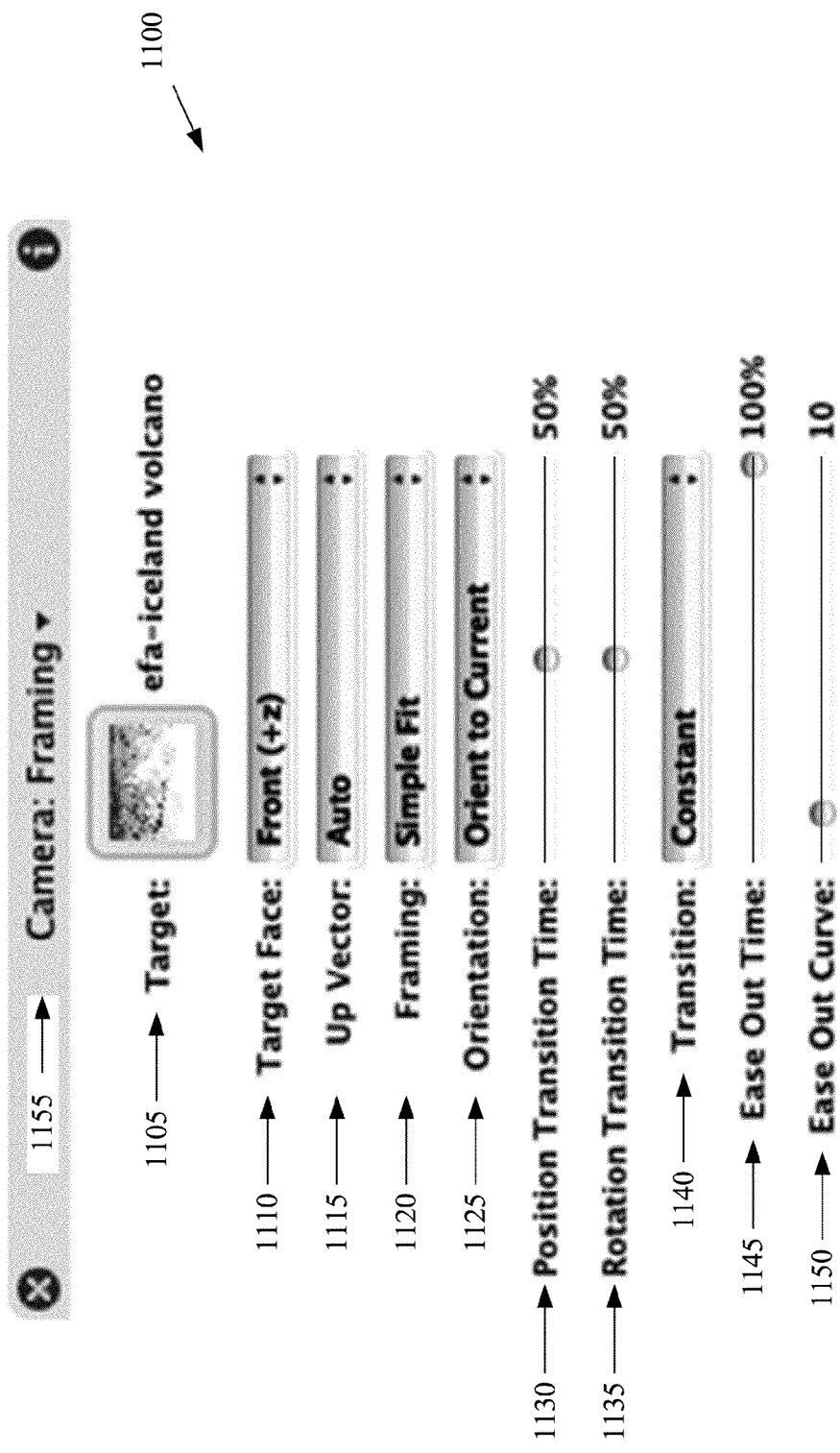
FIG. 11 illustrates the framing controls of some embodiments.

FIG. 11 illustrates the framing controls 1100 for setting a framing behavior of a camera in an exemplary embodiment. It includes (1) a target control 1105 for selecting an object in the scene to target, (2) a target face box 1110, (3) an up vector box 1115, (4) a framing box 1120, (5) an orientation box 1125, (6) a position transition time slider 1130, (7) a rotation transition time slider 1135, (8) a transition box 1140, (9) an ease out time 1145, and (10) an ease out curve 1150.

The target control 1105 presents a user with a way of selecting which object in the scene the behavior should focus on (e.g. which object to take the camera to and frame). Various embodiments provide different ways to activate such a control. For example, clicking on the icon could bring up a pull-down menu listing all the available objects or showing thumbnails of them. In some embodiments, once the object is selected from the pull-down menu, the camera becomes associated with that object. In some embodiments, objects or icons representing the objects could be dragged and dropped onto the framing controls to associate the camera with an object. One of ordinary skill in the art will realize that other types of controls can also be used to associate the camera with the object.

The target face box 1110 determines which face of the target the camera should line up with. Here, the target face is the positive z-axis. Accordingly, when rendering the scene, the framing position of the camera will be on the positive z-axis of the object. In some embodiments, this box provides a pull-down menu that allows any positive or negative axis to be selected, a user defined direction relative to the target (e.g., a direction that is a linear combination of the axis directions), a direction relative to some other object or group of objects, or an axis or direction relative to a global coordinate system.

The up vector 1115 determines which way is up. That is, what direction in the scene will be shown at the top of the screen once the scene is rendered. This vector can also be an axis of the object, a user defined direction relative to the object, or a direction relative to another object, group of objects, or global coordinate system. In some embodiments, the up vector can be set to "auto" which will automatically set an appropriate axis. For example, a default axis that will be the up direction unless the camera is looking along that axis, in which case a second default axis would be set as the up axis.

The framing box 1120 determines what kind of framing the camera should perform. In some embodiments, this box allows (1) a selection of simply framing the object so that the object fills the screen, possibly with parts cropped out, (2) a horizontal or vertical frame, in which the camera is positioned to capture the indicated direction even if that crops the object in the other direction or leaves room on either side of the object in that direction (3) a complete frame in which the camera is positioned so that the object is as large as possible without cropping any of it, and (4) custom fit, in which the application lets a user enter his own framing offsets.

The orientation box 1125 determines whether, at each time in the timeline, the orientation plan will rotate the camera toward where the object is at that particular time on the timeline, or whether the orientation plan will keep turning the camera toward the orientation it will have when it finally frames the object. If the object is moving in a jittery manner, then turning the camera to face whatever the current location of the object is could result in wild swings of the camera as it tries to keep up with the rapid motion of the object. In that circumstance, orienting to the final transition frame may yield better results.

In some embodiments described in this application, the transition time (for getting to a position to frame an object) and the tracking time (for moving with the object to keep it framed as specified) are discussed as independent durations. In other embodiments, one duration is set for the total amount of time for getting into position to frame and for tracking the object to keep it in frame. Some of those embodiments provide a position transition time slider 1130 that allows a user to determine what percentage of the duration for getting to and framing the object will be dedicated to getting into framing position (i.e. transition time) and what percent will be dedicated to tracking the object to keep it in frame. For example, if the position transition time slider 1130 is set for 30% and the duration of the behavior is two-hundred frames then the camera will take sixty frames to reach the framing position and the camera will track the object to keep it framed as specified for the remaining one-hundred-forty frames (barring an ease out setting, described below).

The rotation transition time slider 1135 determines what percentage of the duration of the behavior will be dedicated to rotating toward the target (i.e. rotation transition time). For example, if the rotation transition time slider 1135 is set for 10% and the duration of the behavior is two-hundred frames then the camera will take twenty frames to reach the framing orientation, and will maintain the framing orientation for one hundred-eighty frames (again, barring an ease out setting).

The transition box 1140 affects how the transition proceeds. For example, if the transition box 1140 is set to "constant", then the transition will take place at a constant rate. If the transition box 1140 is set to go slowly at first, then speed up, then slow down again (e.g. to simulate a camera that has inertia), all other parameters unchanged, then the behavior would take the same amount of time to frame the object, but would spend most of that time on the start and finish of the transition, with a shorter, more rapid transition in between. Some embodiments have separate transition boxes for rotation and for motion (e.g. to allow a rapid rotation and an inertial movement).

In some embodiments, a behavior can be set to be less effective after some set portion of that duration. Meaning that the item would average the effects of that behavior with whatever the default behavior of the item was (e.g. a camera of some embodiments defaults to sitting in one position, pointing in the same direction, and not changing its field of view). The ease out time 1145 determines at what percentage of the duration the behavior starts to become less effective. In FIG. 11 the ease out time is 100%, meaning that the behavior retains its full strength for 100% of the duration of the framing behavior. However, if the ease out time were set at 70% then the camera would start falling behind the object after 70% of the duration of the behavior, and stop entirely at 100% of the duration of the behavior. In some embodiments, a setting of 70% would mean 70% of the duration of the framing behavior as a whole, in other embodiments, it would mean 70% of the tracking duration.

Some embodiments with an ease out time also have an ease out curve slider 1150. In such embodiments, the slider determines how quickly the behavior weakens. For example, an ease out curve of zero would create a steady decline in behavior strength, while a higher ease out curve would create a faster initial drop in behavior strength followed by a slower decline of the remaining behavior strength. This could be used for example to simulate friction or air resistance slowing down a (hypothetical or virtual) vehicle carrying the simulated camera.

FIG. 11 does not illustrate a control for setting the total time for the "getting to and framing" behavior. However, in some embodiments, a control panel similar to control panel 1100 includes a control for setting that time. In some embodiments, the total time can be adjusted using the icons of a timeline such as timeline 360 (e.g., by selecting an edge of a timeline icon representing the framing behavior and extending or reducing its length on the timeline). Other embodiments have controls that directly set time to frame and time to hold frame. The applications of some embodiments provide other tools for affecting the behavior of the camera, e.g. tools to increase the offset of the camera from the straight line connecting the starting and end points. Some embodiments provide a pulldown menu 1155 that allows a user to change to a different type of behavior, as described in section IV below.

F. Camera Paths

Figure 12:
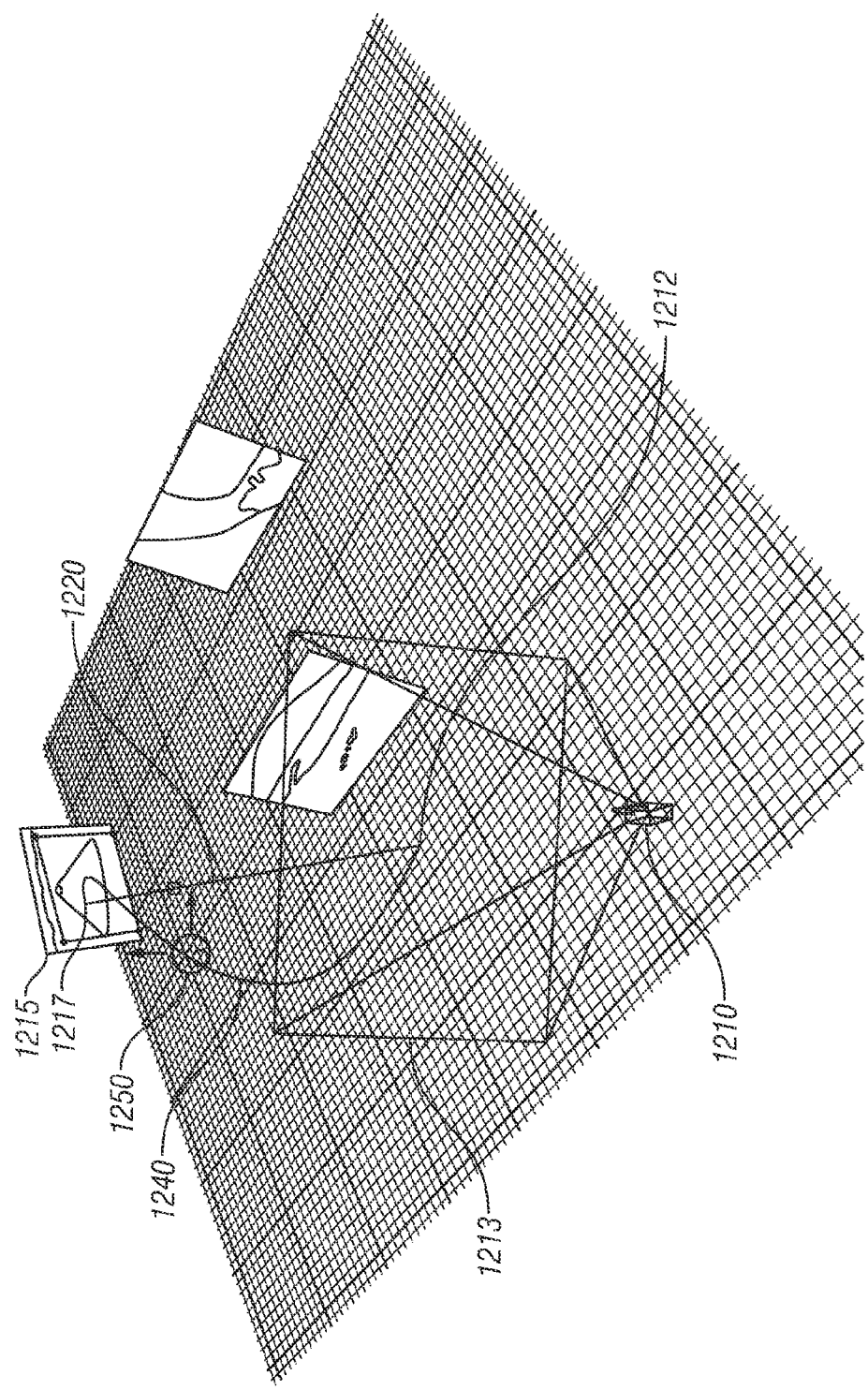
FIGS. 12-14 illustrate an exemplary application with a targeted object and the effects of various adjustments of the framing behavior.
Figure 13:
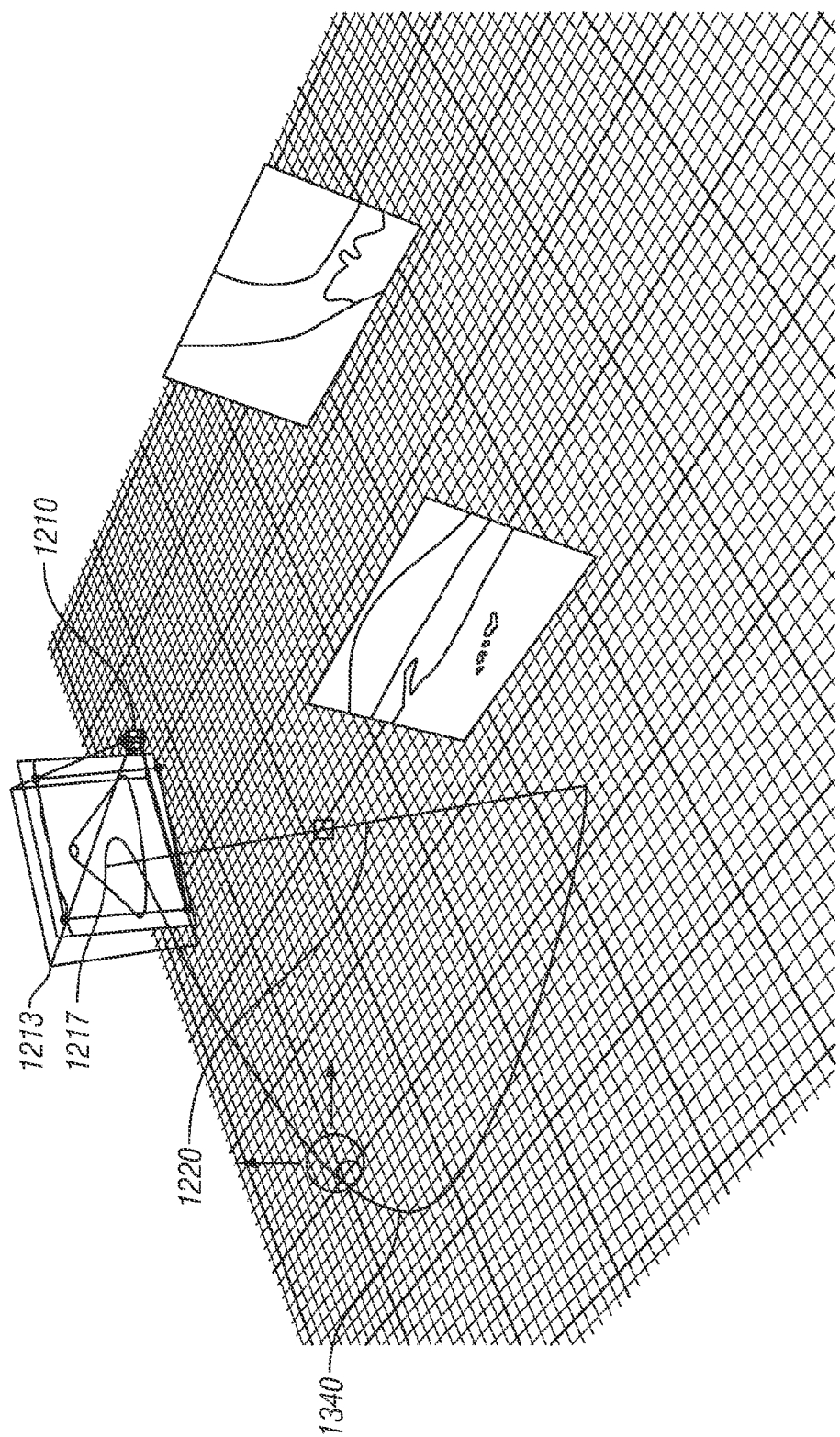
Figure 14:
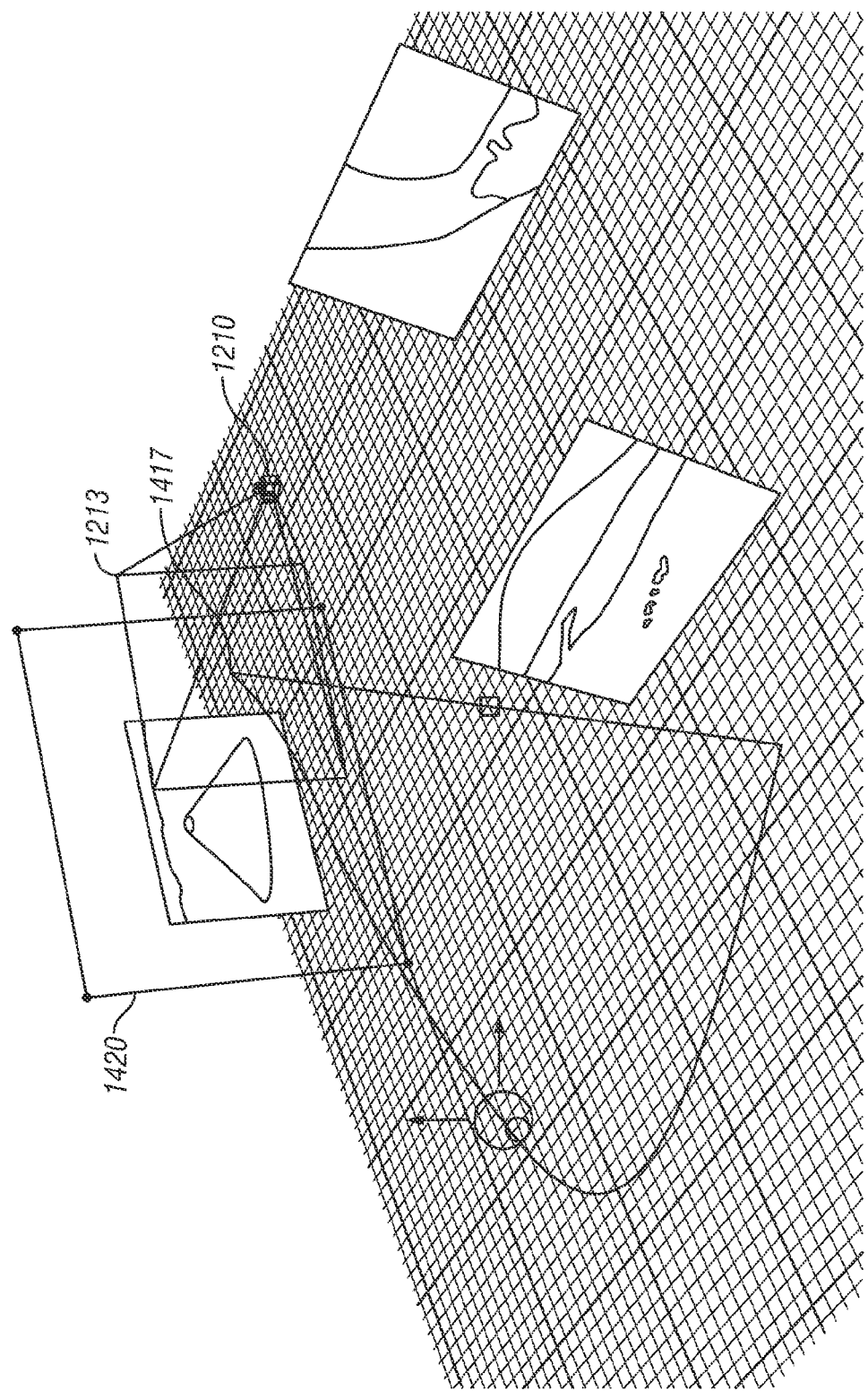
Figure 24:
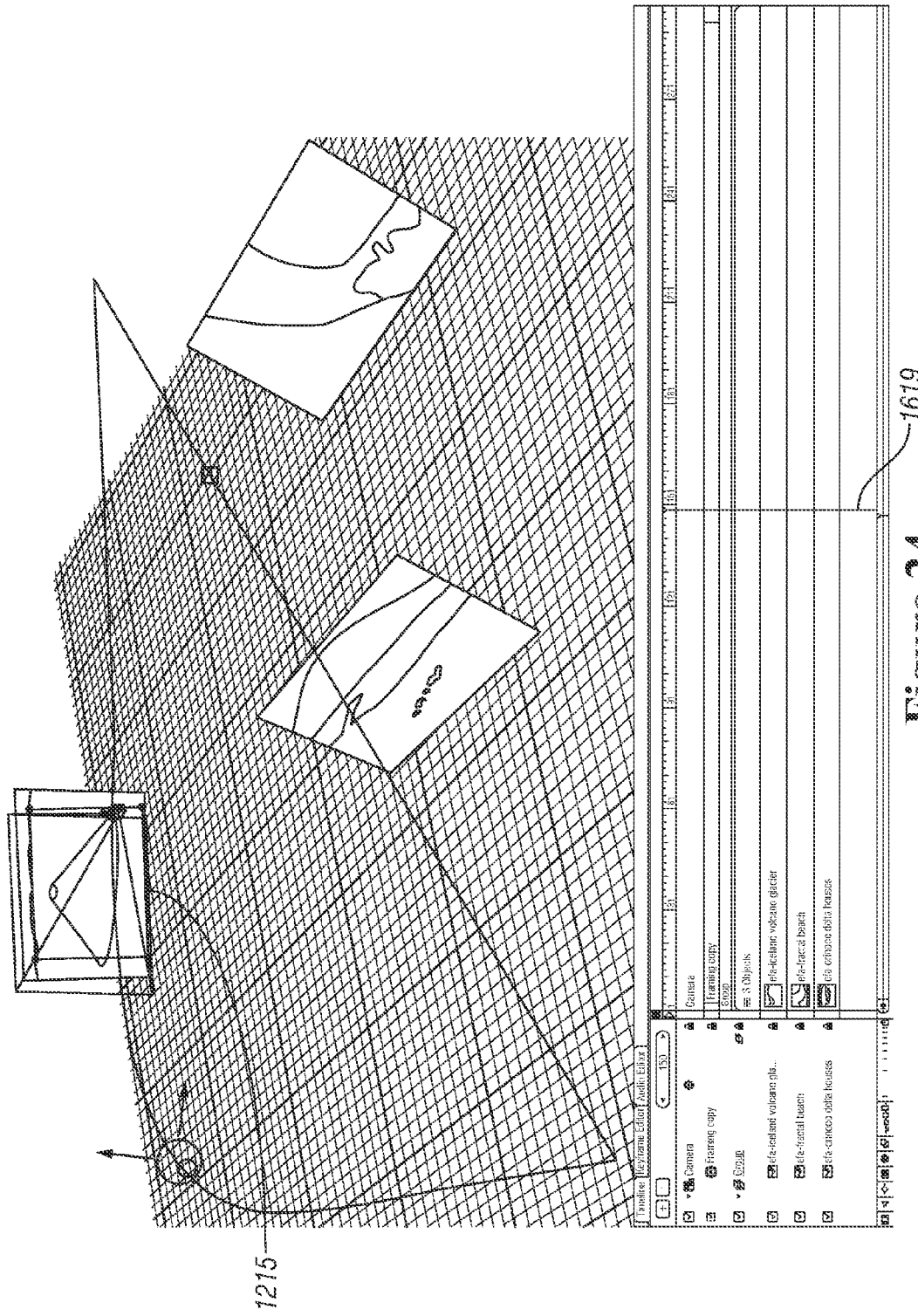
Figure 25:
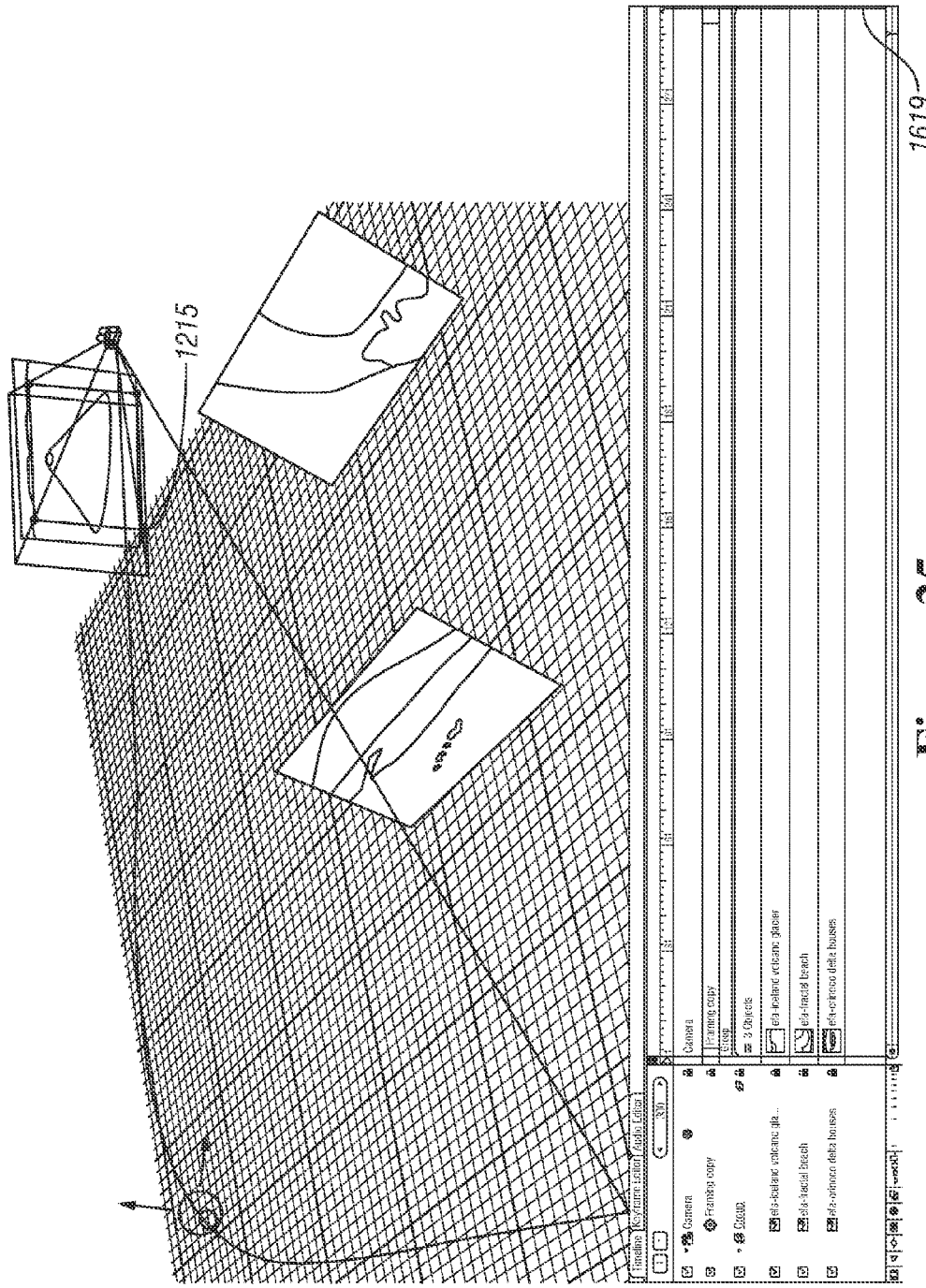
Figure 26:
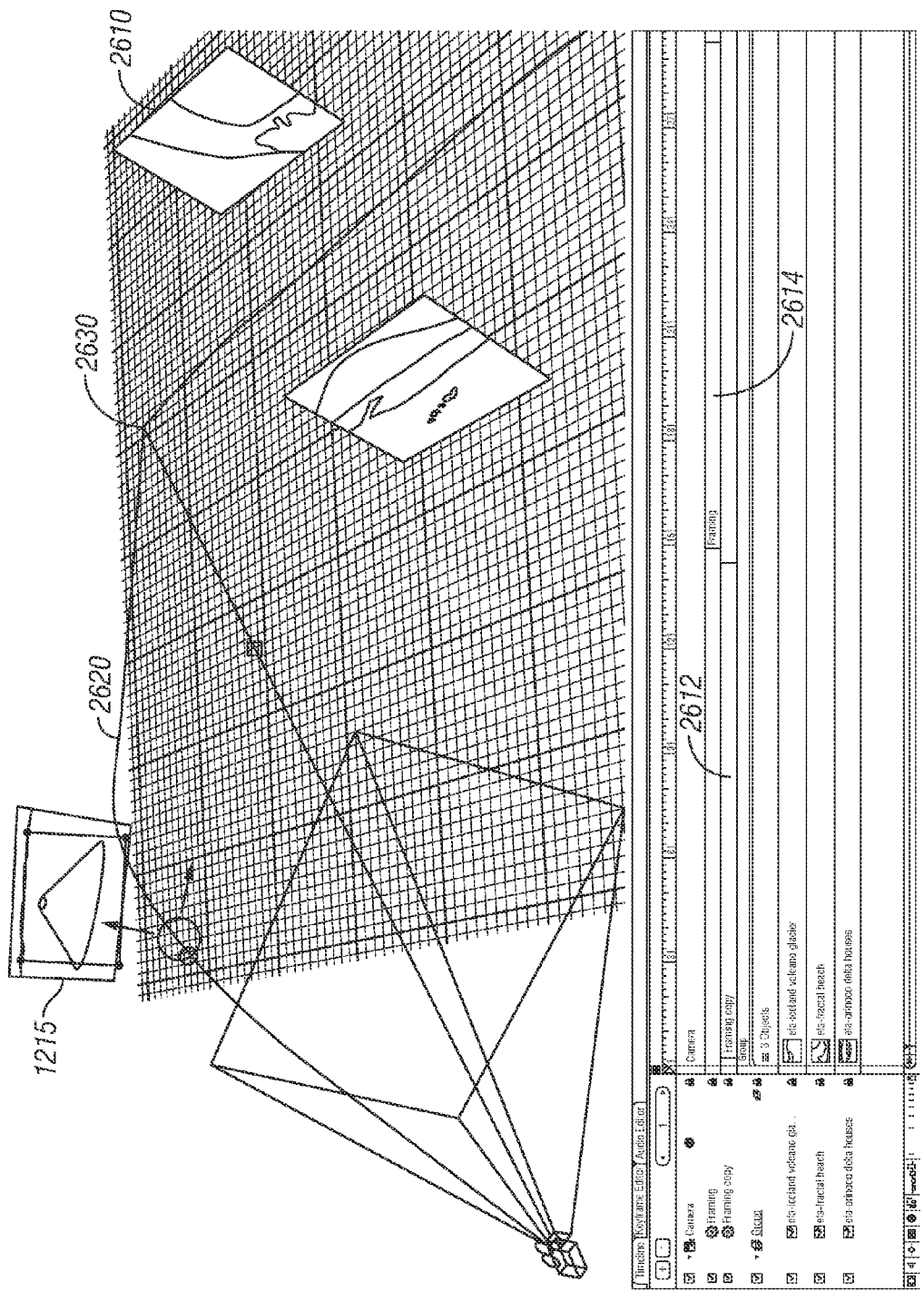
FIGS. 26-27 illustrate the effect of overlapping framing behaviors on the path of the camera.
Figure 27:
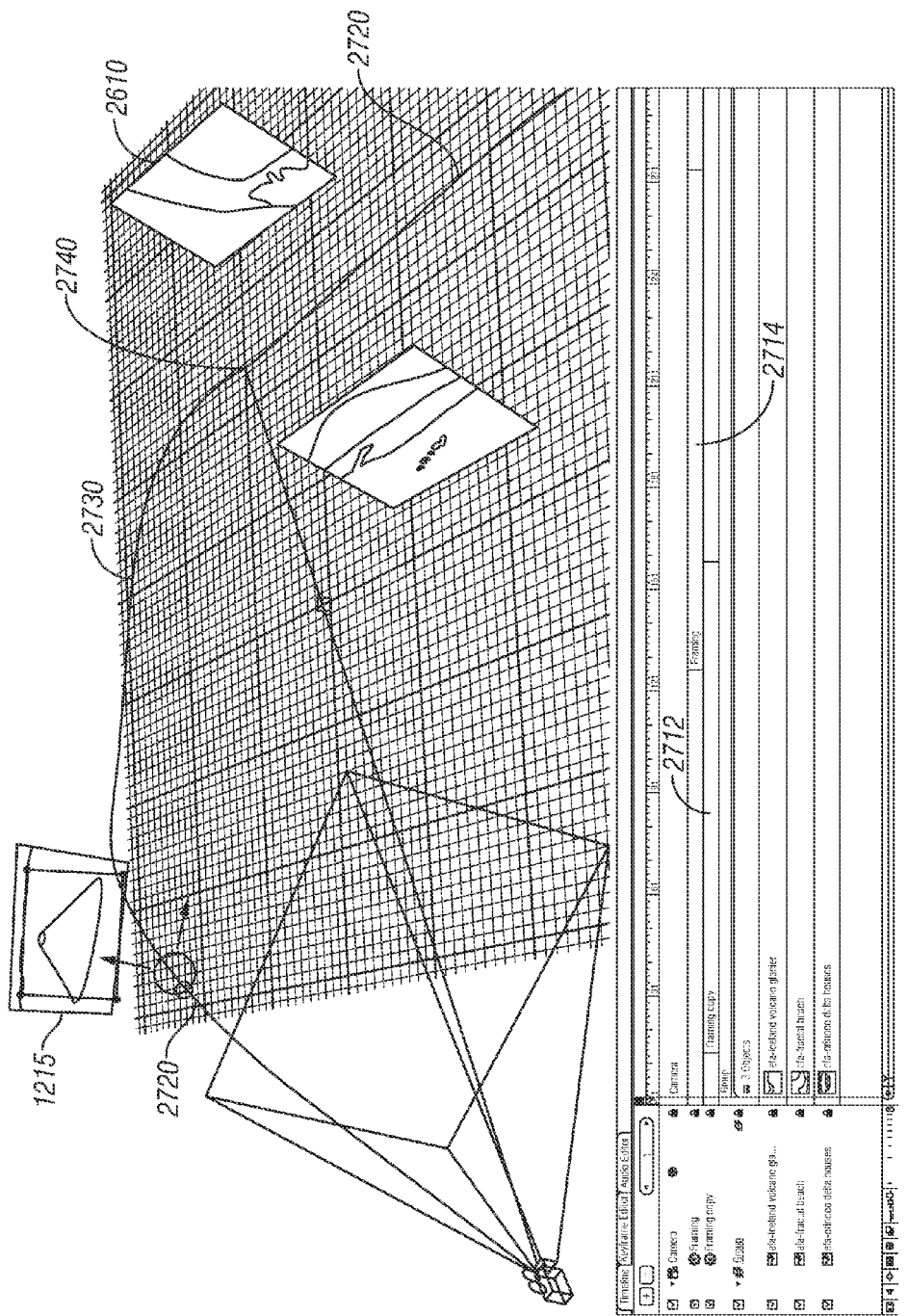

FIGS. 12-27 illustrate the paths generated for a camera by an exemplary embodiment with under various settings described in relation to the individual images. The various different types of paths are divided into sections. FIGS. 12-14, described in section III.A., illustrate how the application represents a targeted object to the user in some embodiments and the effects of various adjustments of the parameters for framing behavior on the path the camera will take. FIGS. 16-21, described in section III.H., illustrate the framing of multiple objects. FIGS. 22-25, described in section III.I., illustrate the framing of a moving object. FIGS. 26-27, described in section III.J., illustrate the effect of overlapping framing behaviors on the path of the camera.

G. Path of the Camera's Frame

In some embodiments, the path displayed in the display window (that displays the 3D space) is not the path that the camera itself will take, but rather the path that the camera's center of view will take while getting to and framing the object. FIG. 12 illustrates a camera's path to its target in such an embodiment. A camera 1210 starts out a scene at a particular location, and pointing at endpoint 1212 (centered in frame 1213). The camera has been set to target object 1215. The application has generated a path and orientation plan to take the camera into position to frame object 1215, that is, to point at object 1215 straight along a specified axis of object 1215.

When the camera 1210 has framed the object, endpoint 1217 will be at the center of frame 1213. In this embodiment, the application connects the endpoints 1212 and 1217 using a straight line 1220. The application also shows a curved path 1240 representing the location of the center of the frame 1213 at various times from the beginning of the behavior until the end of the behavior. The application provides a control 1250 on the curved path for adjusting the shape of the curved path. In the illustrated embodiment, the camera 1210 is initially oriented to the right of the orientation it will have when framing object 1215. According, camera 1210 would rotate to face more to the left as it moves toward object 1215. This is reflected in the figure by the path initially curving to the left.

The results of adjusting the shape of the curved path 1240 are illustrated in FIG. 13. Curved path 1340 has been moved by a drag operation on the control 1250 to be farther from the straight line. 1220. This figure illustrates the camera 1210 at the end of its path and orientation plan. The camera 1210 is at its focal distance from object 1215, along its z-axis and frame 1213 is centered on endpoint 1217.

As described above in subsection III.A., some embodiments allow a camera to target an object for framing, but apply an offset to the framing. FIG. 14 illustrates the camera 1210 framing object 1215 with an offset away from the object along the z-axis of the object. Frame 1213 is now centered on endpoint 1417, while large frame 1420 surrounds object 1215 and shows the relative size of the object to the field of view of the camera 1210, when the camera 1210 is at the indicated location and with the indicated field of view. Some embodiments allow offsets in any direction.

Figure 15:
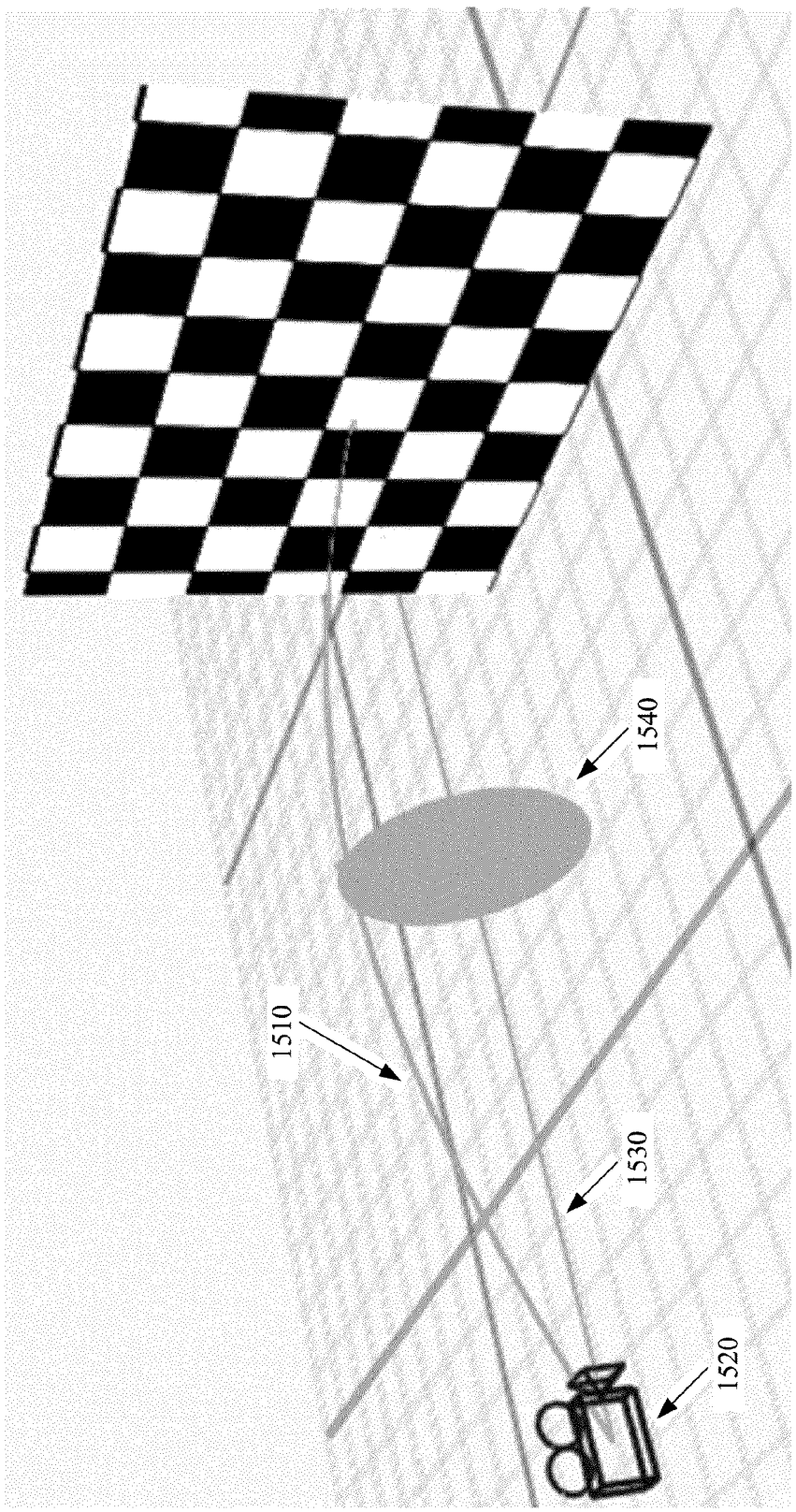
FIG. 15 illustrates an embodiment for determining a camera path.

In some embodiments, illustrated in FIG. 15, the path 1510 of the camera 1520 is represented by a straight line 1530, from the starting location to the ending location, and a disk 1540 centered on the straight line. The disk is movable along the straight line, and changes sizes as it moves along the straight line in such a way that the edge of the disk intersects the curved line.

H. Framing Multiple Objects

Some embodiments allow framing of multiple objects at different times. FIGS. 16-21 illustrate a sequence of camera positions and orientations at multiple times within a scene, where the camera has been set to target multiple objects in turn. FIG. 16 shows the camera paths of some embodiments. In this figure, the curved path 1600 represents the planned motion of camera 1610 itself, rather than the motion of the center of the frame like in section III.G.).

The curved path 1600 is determined by the behaviors set up on the timeline 1612. The timeline 1612 has camera behaviors 1614, 1616, and 1618 and time mark 1619. Behavior 1614 targets object 1620, behavior 1616 targets object 1215, and behavior 1618 targets object 1630. Because time mark 1619 is at the beginning of the timeline, the camera is at the beginning of path 1600.

Figure 17:
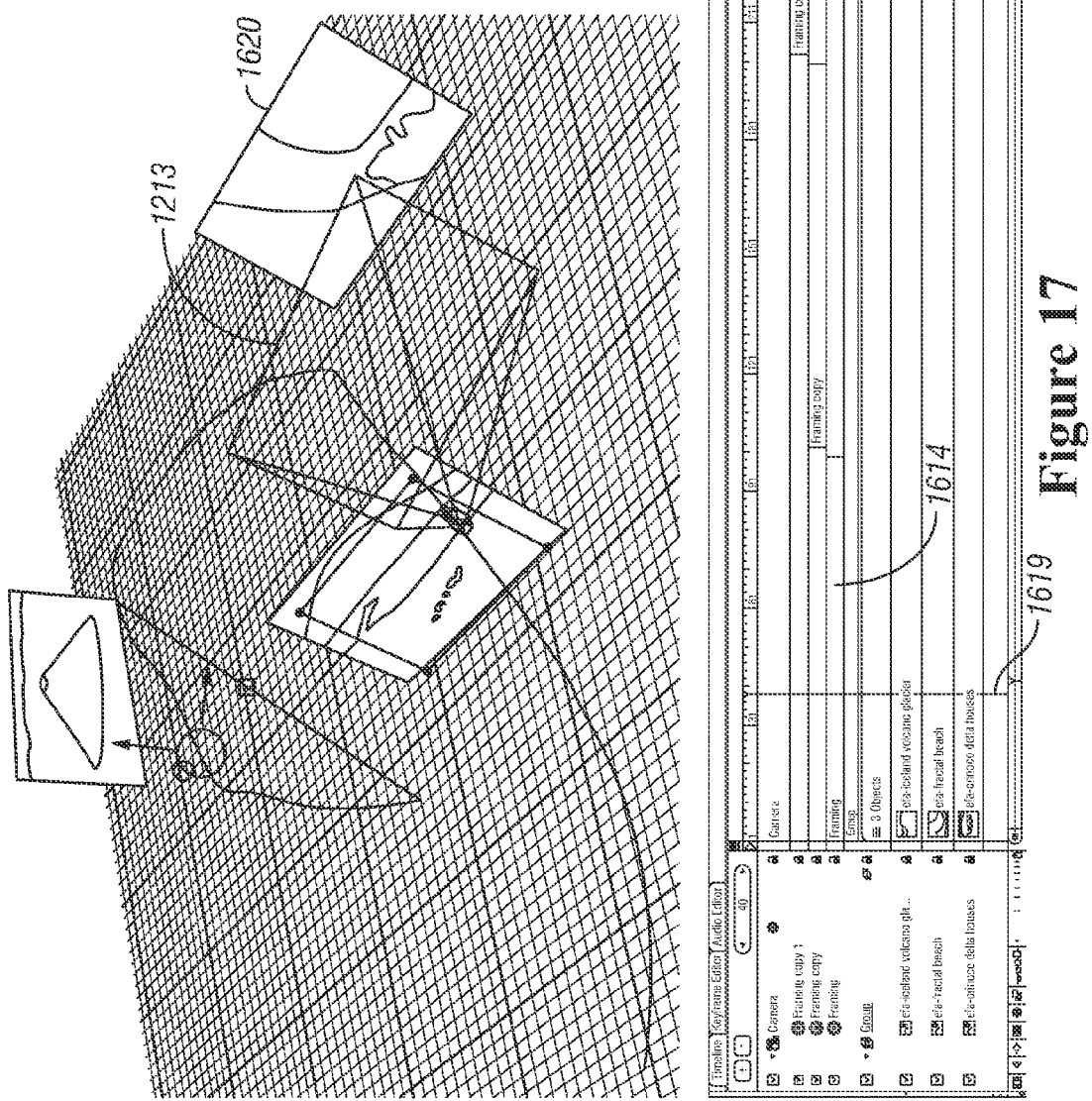
Figure 18:
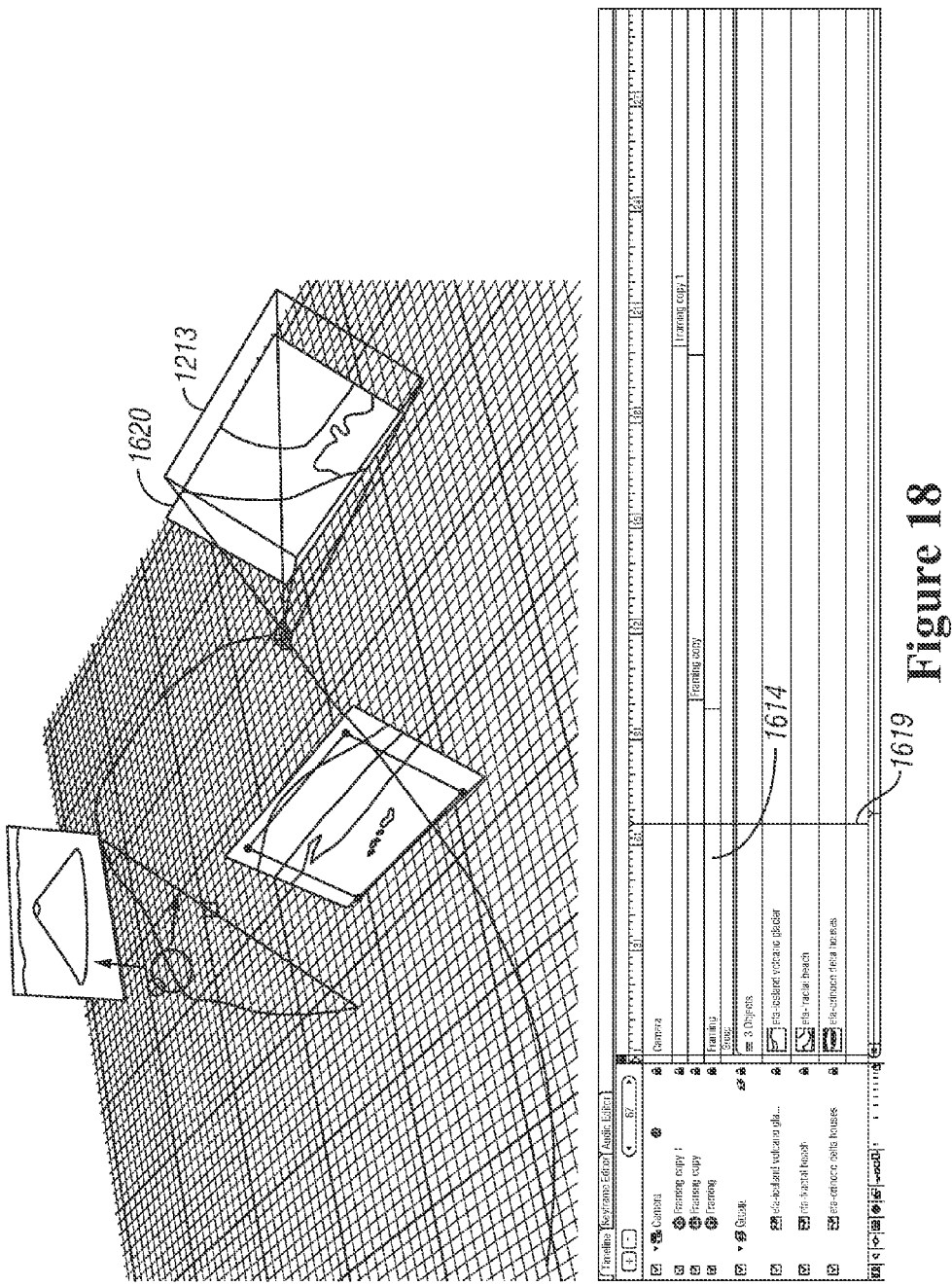

FIG. 17 illustrates the scene at a later time. Time mark 1619 has moved about 35% of the way along behavior 1614. As the behavior 1614 is set to have the camera 1610 reach the framing position 50% along the behavior, the frame 1213 has not yet reached the framing position for object 1620. FIG. 18 illustrates the scene when the time mark has passed the 50% mark of behavior 1614. Object 1620 is now fully framed in frame 1213.

Figure 20:
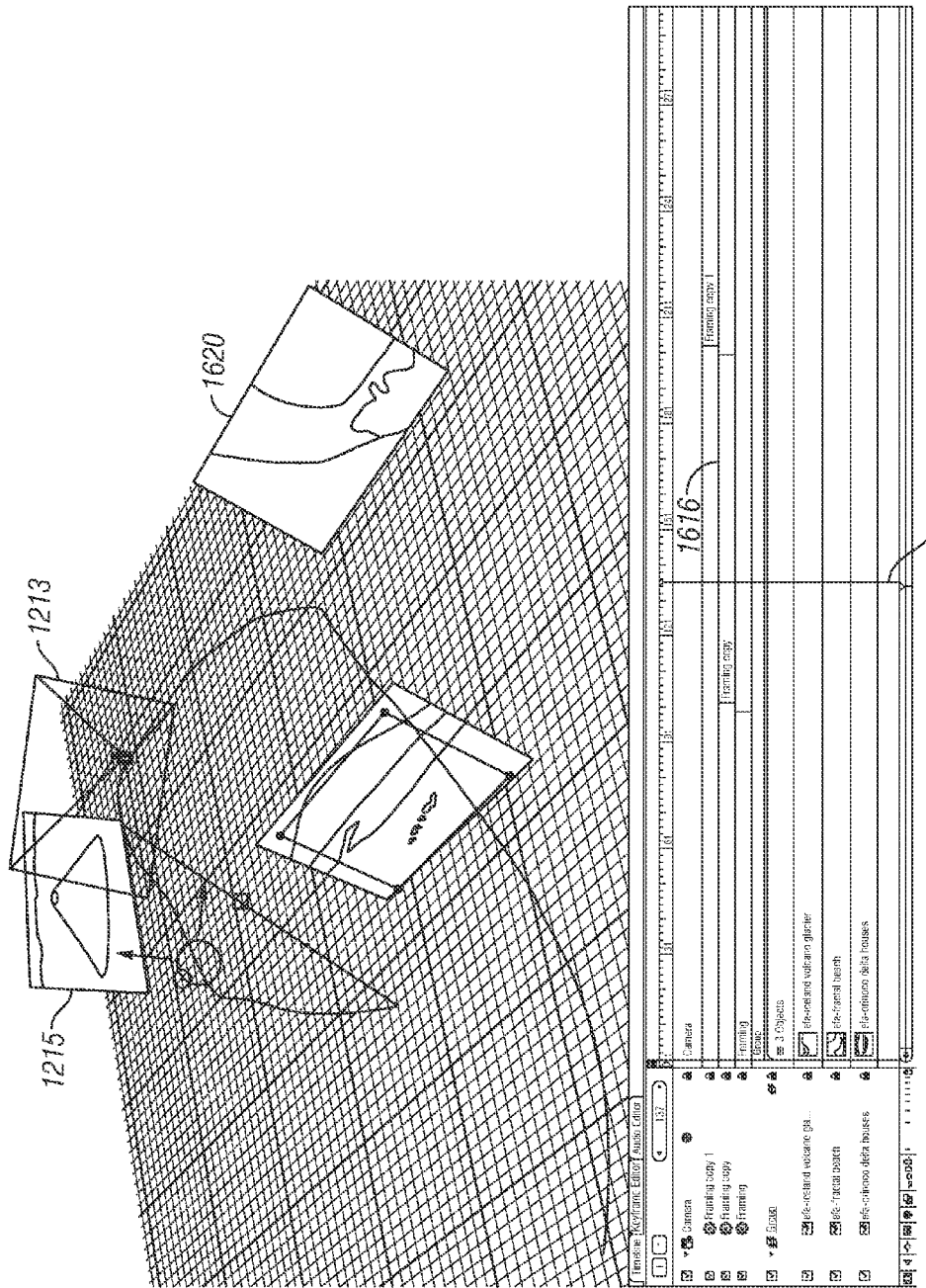
Figure 21:
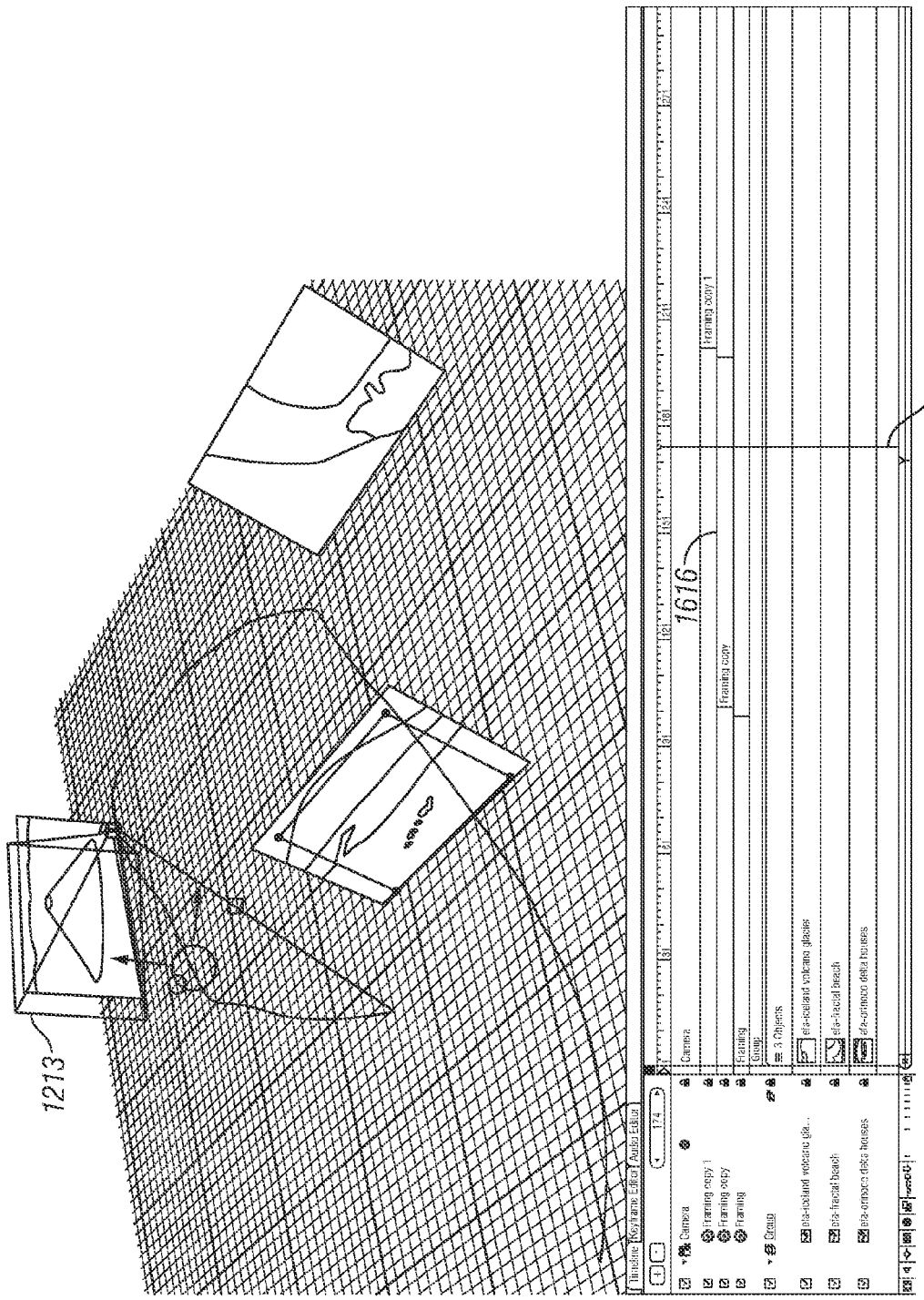

In FIG. 19, the time mark has moved from behavior 1614 to behavior 1616. The camera 1610 has started to move to target 1215 as dictated by behavior 1616. The starting point 1910 for the camera's path 1600 to object 1215 is the position of the camera at the end of behavior 1614 (i.e. framing object 1620). As the time mark 1619 is at a very early point in behavior 1616, camera 1610 is only slightly displaced from starting point 1910. FIGS. 20-21 respectively illustrate the position of camera 1610 shortly before and after the 50% point along behavior 1616. As before, the 50% mark is the demarcation between the transition portion of the framing behavior and the tracking portion of the framing behavior. Accordingly, the camera 1610 is just about to, and has just begun framing target 1215, in FIG. 20 and FIG. 21 respectively.

I. Framing a Moving Object

Figure 22:
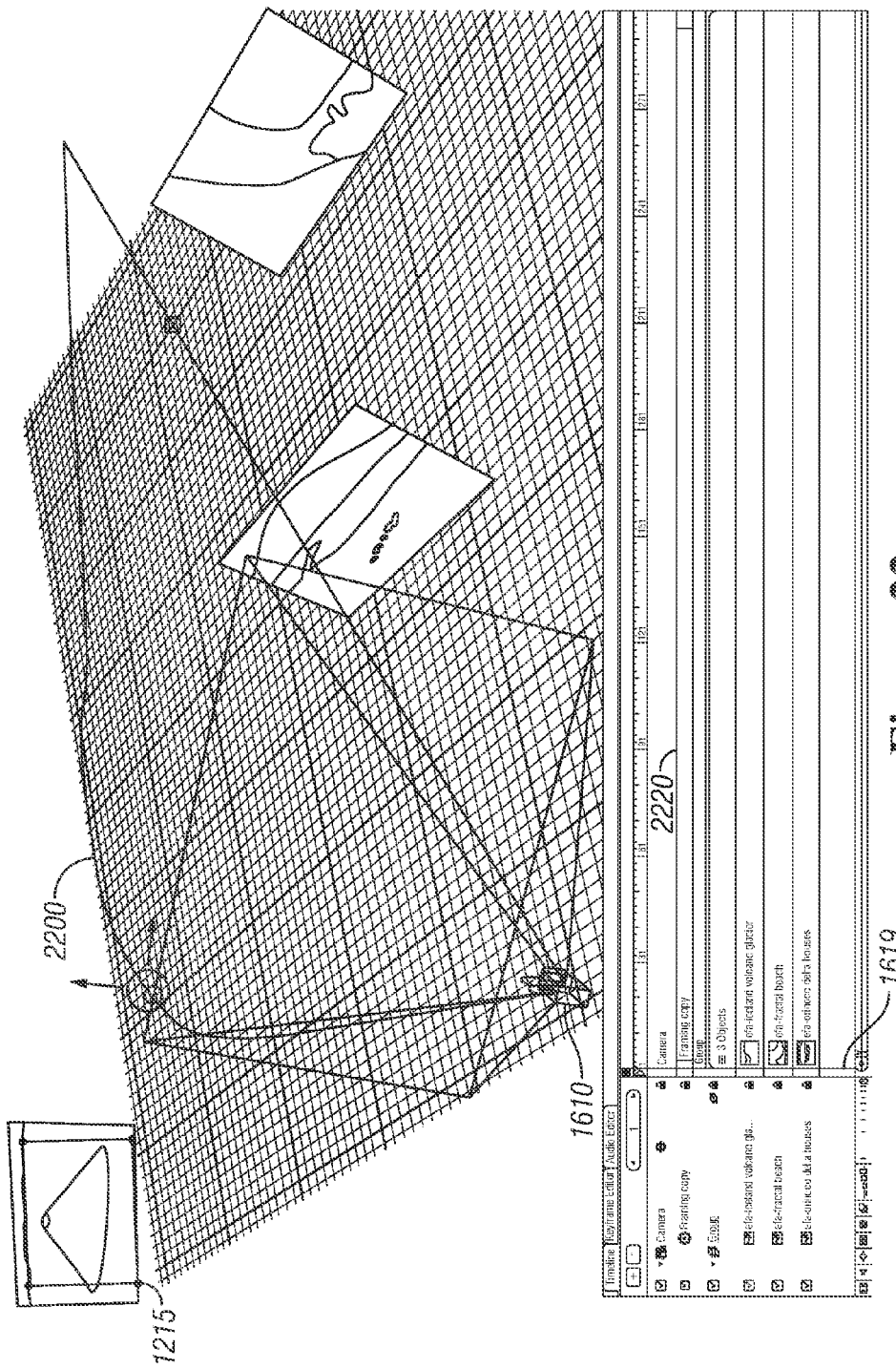
FIGS. 22-25 illustrate the framing of a moving object.
Figure 23:
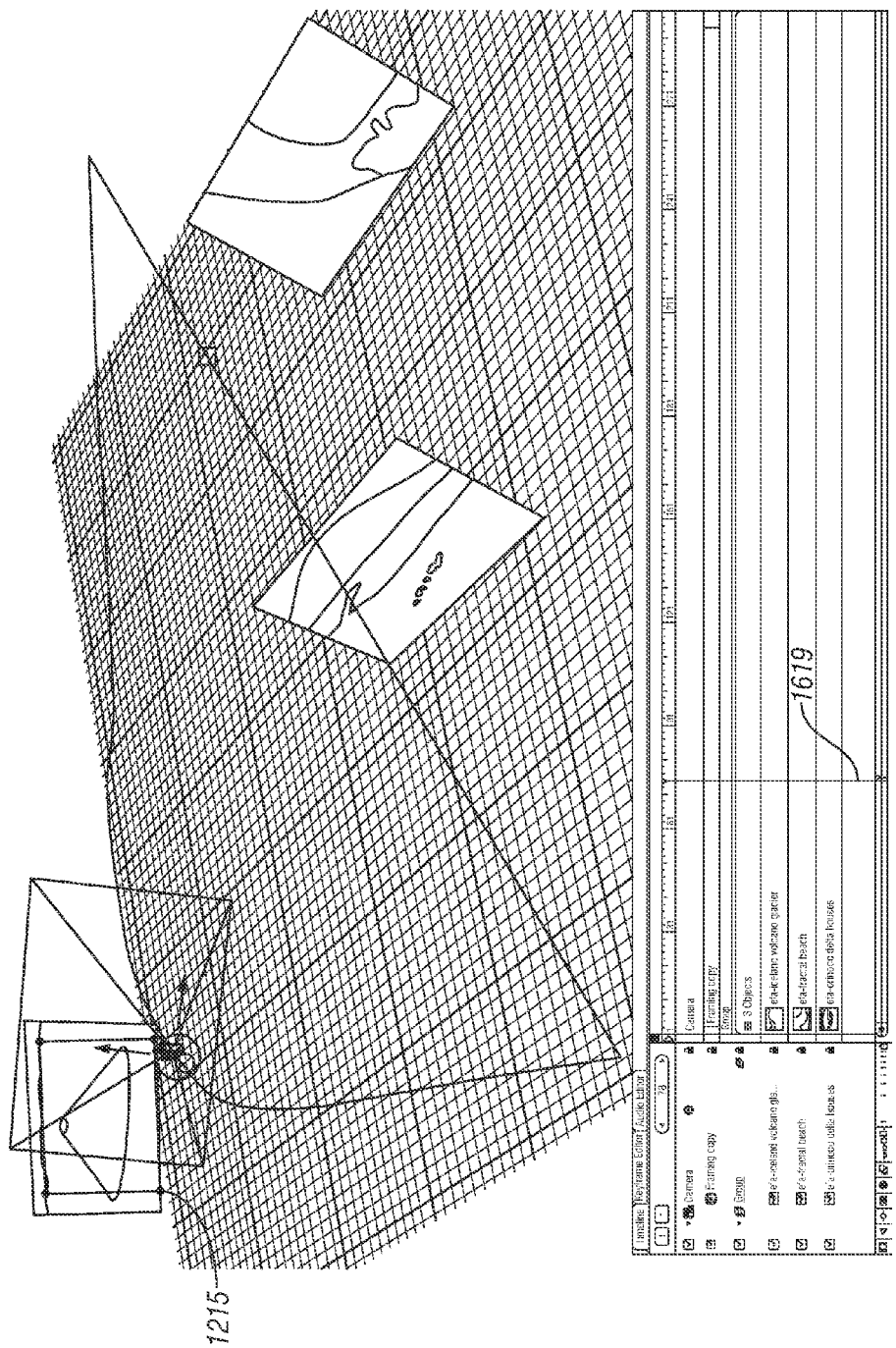

In some embodiments, a camera behavior can be provided that sets the camera to target an object that has one or more behaviors of its own, such as commands to move or rotate. FIGS. 22-25 illustrate sequential camera positions at multiple times as the camera 1610 moves and rotates to frame object 1215 while object 1215 itself moves. FIG. 22 illustrates the curved path 2200 that the camera will take to frame and follow object 1215. Time mark 1619 is at the beginning of the scene, before behavior 2220, which is set so that the camera 1610 targets object 1215 on the timeline. In FIG. 23, time mark 1619 is about 25% of the way along behavior 2220. Object 1215 has moved to the right and camera 1610 has moved closer to object 1215 and is still turning to face it. In FIG. 24, time mark 1619 has moved past the 50% point of behavior 2220. Object 1215 has moved farther to the right, and camera 1610 has framed object 1215. In FIG. 25, time mark 1619 has moved past the end of behavior 2220, so camera 1610 has stopped tracking object 1215. Object 1215 has moved right since camera 1610 stopped tracking it and so the camera no longer frames it (though most of the object is still within the view of camera 1610).

J. Overlapping Framing Behaviors

In some embodiments, multiple behaviors for a camera can overlap. In such embodiments, the resulting movement and rotation of the camera gradually changes from following the earlier behavior, to following the later behavior. In some embodiments, this gradual change is accomplished by taking a weighted average of the positions and orientations that the behaviors would separately indicate, where the weighted average smoothly transitions from entirely the first behavior to entirely the second behavior during the overlapping time. In other embodiments, the second behavior modifies the position/orientation resulting from the first.

In order to provide contrast FIG. 26 illustrates a scene with non-overlapping behaviors in which camera 1610 targets moving object 1215 and then stationary object 2610. Behavior 2612 causes the camera 1610 to target object 1215 and behavior 2614 causes the camera 1610 to target object 2610. The application has generated path 2620. The path 2620 has a kink 2630 indicating the location where neither behavior is active. The kink 2630 is there because the part of the path before (to the left of) kink 2630 is determined by behavior 2612 and the part of the path 2620 after (to the right of) the kink 2630 is determined by behavior 2614.

FIG. 27 illustrates a very similar scene with overlapping behaviors in which camera 1610 also target moving object 1215 and then stationary object 2610. The only difference in settings is that behavior 2712 overlaps behavior 2714, on the timeline while the camera behaviors in FIG. 26 do not overlap. In this figure, path 2720 is different in each of three parts bounded by kinks 2730 and 2740. The part of the path before (to the left of) kink 2730 is determined solely by behavior 2712 (and the motion of object 1215). The part of the path after (to the right of) kink 2740 is determined solely by behavior 2714 (and the position of object 2610).

In some embodiments, during any period where two different framing behaviors (that each associate the camera with a different object) overlap, the calculation of the position and orientation of the camera can be worked out by calculating the position and orientation the camera would be in if it were framing the first target, and then using that position and orientation as input for the subsequent calculation to frame the second target.

In some embodiments, a later, overlapping framing behavior overrides a previous framing behavior while the behaviors overlap. In other words, in such embodiments, the effect of the later behavior is the same as if the camera simply had simply been waiting at the location and orientation that it had as of the start of the later framing behavior. In some embodiments, a later framing behavior is interpolated with the earlier framing behavior during the period that they overlap.

This section described framing behavior, however, some embodiments allow other behaviors to be associated with a camera. Several such behaviors are described in section IV, below. One of ordinary skill in the art will realize that the described behaviors are examples and that some embodiments provide applications that associate other behaviors with cameras over specified durations.

IV. Other Behaviors

A. Behavior of Objects

In some embodiments, an application provides controls for a user to set and modify one or more behaviors that a selected object will exhibit over a specified duration of time. For example, a behavior for an object could be "move along a specified path", "rotate", "move it back and forth", "change its size", or (for video clip objects) "play the video clip at a specified rate" (e.g. in slow motion), etc.

B. Behavior of Cameras

Figure 28:
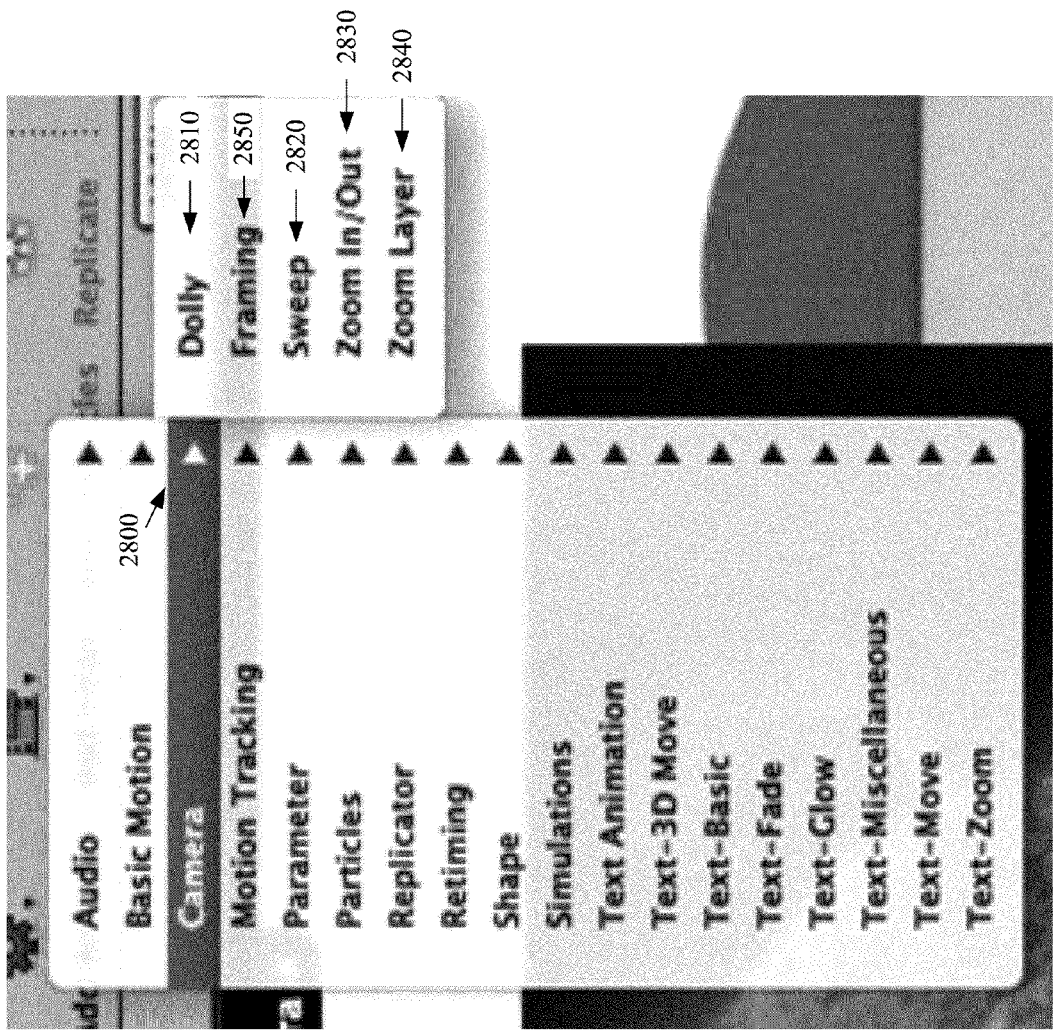
FIG. 28 illustrates a set of controls of some embodiments for assigning various behaviors to a camera.

Some embodiments provide controls that allow a user to assign one or more behaviors to a camera for some duration, and modify any behaviors assigned to the camera. FIG. 28 illustrates a set of controls of some embodiments for assigning various behaviors to a camera. In this figure, pulldown menu item 2800 provides access to behavior controls 2810-2850. Behavior control 2810 sets the camera to "dolly", that is, to move along a set path (e.g. in the direction the camera is pointed, sometimes called the "camera's local z-axis") over the duration of the behavior. Behavior control 2820 sets the camera to sweep. In some embodiments, sweeping changes the orientation of the camera without changing its position. In some embodiments, sweeping keeps the camera pointing at a particular location in the 3D space as the camera revolves about that point. Behavior control 2830 sets the camera to "zoom" in or out, that is, to narrow or widen its field of view.

In some embodiments, the application provides behaviors relative to an object or group of objects. For example, behavior control 2840 sets the camera to "zoom layer" also called "dolly zoom". A dolly zoom comprises moving the camera while changing the focus of the camera such that a particular object or group of objects stays the same in the field of view while other objects behind it appear to change size. These behaviors are described further in subsections IV.C-IV.F., below. Behavior control 2850 sets the camera to "frame" a particular object, as described above. Some embodiments provide other types of controls for assigning behaviors, and provide other behaviors.

Though the behaviors herein are described as having certain controls for adjusting certain parameters of the behaviors, one of ordinary skill in the art will understand that in other embodiments, other ways of specifying the same parameters may be used. For example, some embodiments provide controls that allow a user to directly set the starting and ending conditions of a behavior. Some embodiments provide controls that allow a user to set the magnitude (e.g. distance) of the change a behavior will make over the specified duration and use the pre-existing parameters of the camera (e.g. initial position and orientation) as the value of the parameters at the start of the duration. Some embodiments provide controls allowing the user to specify the ending conditions (e.g. a position) for a behavior and the other effects are determined in relation to some object. For example, a framing behavior could have user definable parameters for the ending location, but determine the orientation and/or field of view of the camera such that it maintains the object in a given portion of the field of view.

Figure 29:
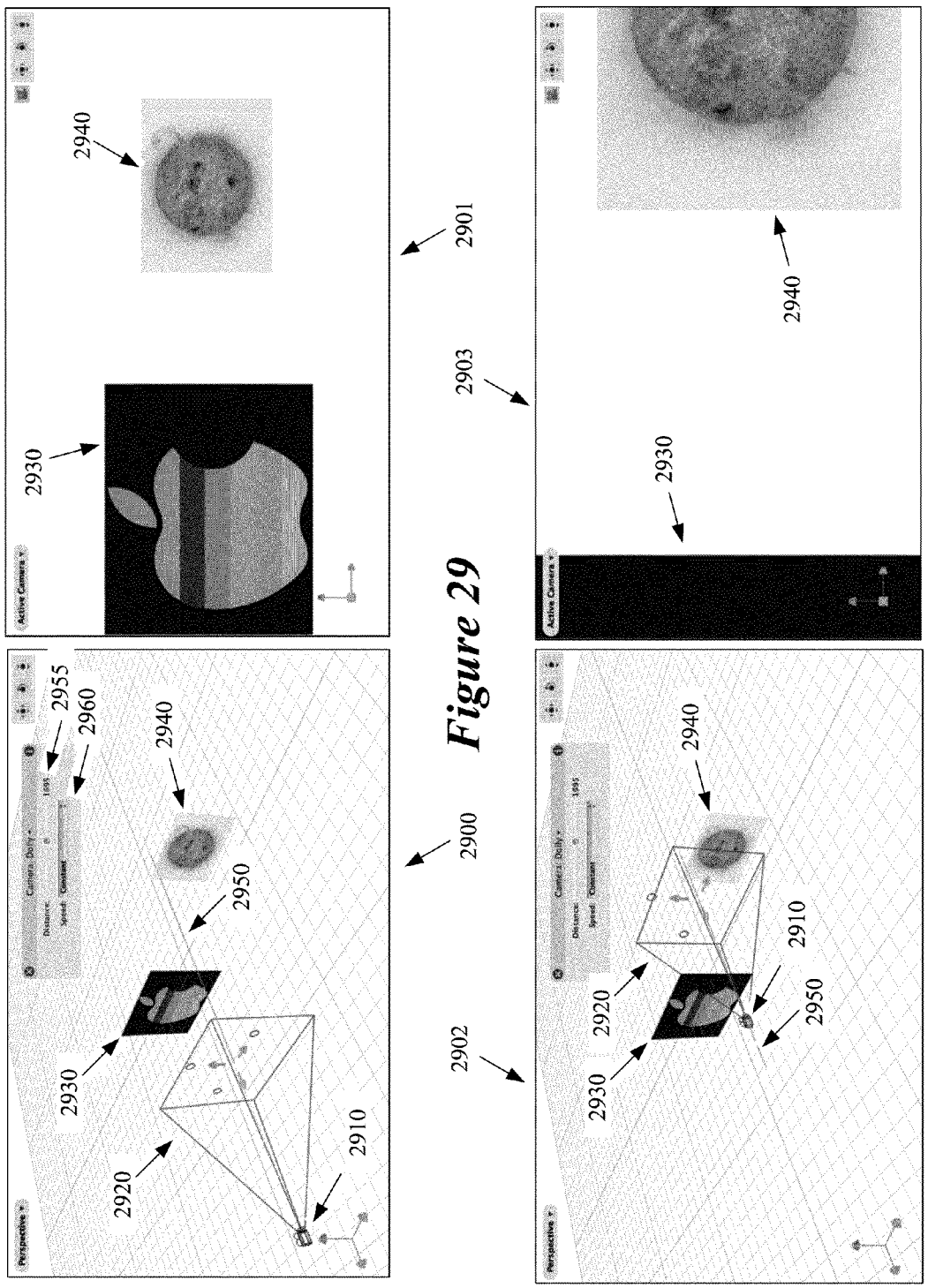
FIG. 29 illustrates the motion of a camera during the duration of a dolly behavior and the effects of that motion on the rendered image.

One of ordinary skill in the art will realize that many of the characteristics of the framing behavior described above also apply to camera behaviors in general. For example, the C. Dolly Behavior In some embodiments, when a dolly behavior is associated with a camera over some duration, the camera changes its position over that duration. FIG. 29 illustrates the motion of a camera during the duration of a dolly behavior and the effects of that motion on the rendered image. Screenshot 2900 shows a three-dimensional space at the beginning of the selected duration of a dolly behavior that has been associated with camera 2910. Camera 2910 has a field of view indicator 2920. As the field of view indicator 2920 shows, at the beginning of the duration of the dolly behavior, an apple image 2930 and a circle image 2940 are both within the field of view of the camera 2910. Path 2950 is the course of the camera during the duration of the dolly behavior.

Screenshot 2901 shows the rendered frame corresponding to the three-dimensional space of screenshot 2901, i.e. at the beginning of the duration of the dolly behavior associated with the camera. As indicated above, apple image 2930 and circle image 2940 are within the field of view of the camera and because of this, they are shown in the rendered frame.

Screenshot 2902 shows the three-dimensional space later in the duration of the dolly behavior. At this time in the duration, the camera 2910 has moved forward along the indicated path. Only the right edge of the apple image 2930 and the left half of the circle image are in the field of view of the camera 2910. Accordingly, the corresponding rendered frame shown in screenshot 2903 shows the right edge of the apple image 2930 and the left half of 2940.

Some embodiments provide a control 2955 that determines how far the camera will be moved over the duration of an associated dolly behavior. In such embodiments, the starting point of the camera is the location that the camera happens to be when the behavior starts. Some embodiments have other types of controls to determine the starting and ending points of the camera at the beginning and ending of the duration. For example, some embodiments provide controls that allow a user to specify an ending point of the dolly behavior, rather than specifying a distance, and travels from wherever the camera happens to be to that ending point over the duration. Some embodiments provide controls that allow a user to specify both a starting and an ending point.

Some embodiments provide a control 2960 that sets a parameter for the behavior that affects how the camera moves over that distance. For example, if the control 2960 is set to constant, then the camera 2910 will move the same distance in each frame over the duration of the dolly behavior. In some embodiments, the control 2960 can be set to simulate the effects of inertia, moving slowly at the beginning of the duration, picking up speed as the duration progresses, traveling at a constant speed during the middle of the duration, then losing speed until it stops at the end of the duration (and the end of the selected distance). Some embodiments have other parameters that affect the dolly behavior.

D. Sweep Behavior

Figure 30:
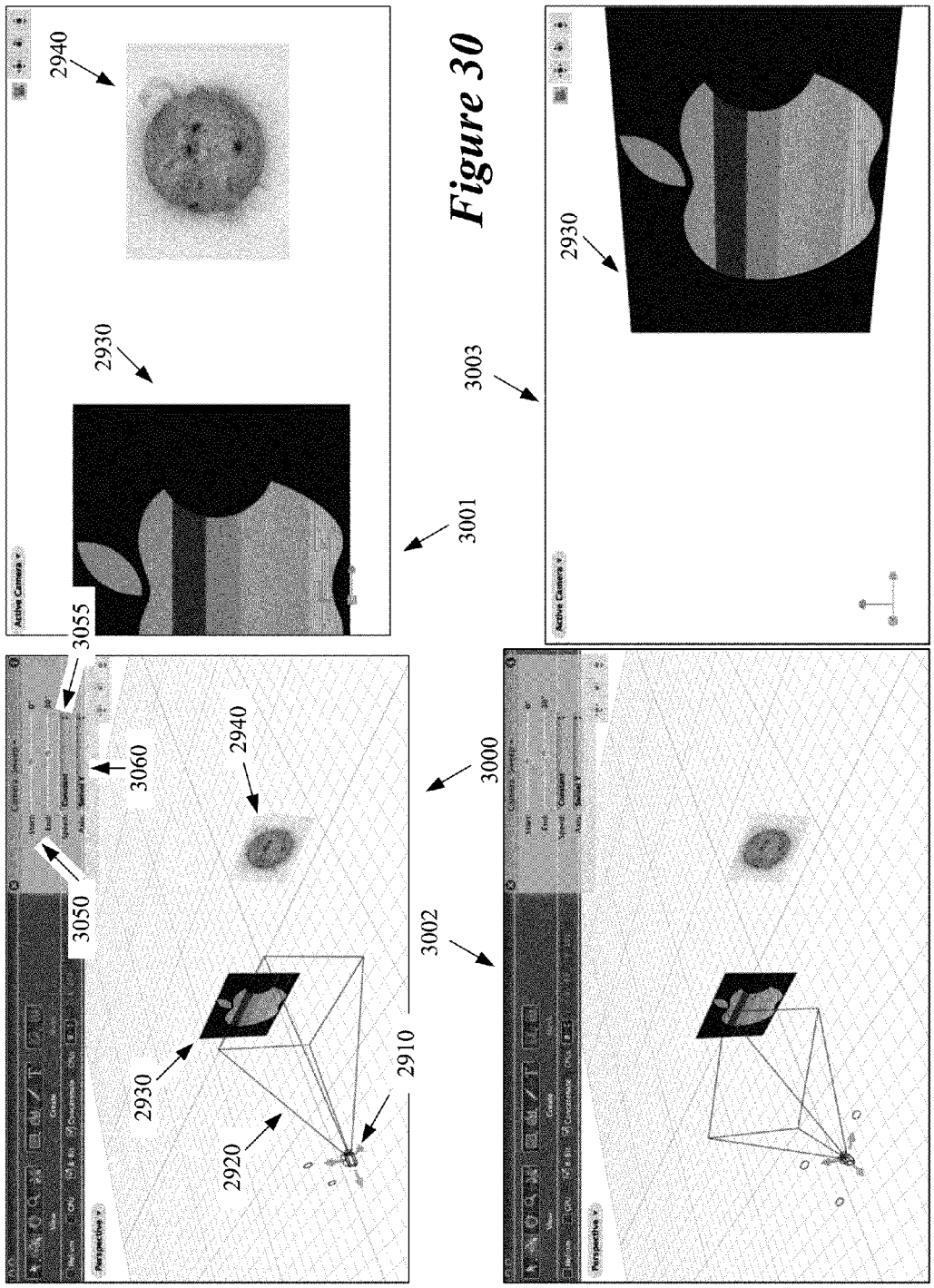
FIG. 30 illustrates the rotation of a camera during the duration of a sweep behavior and the effects of that motion on the rendered image.

In some embodiments, when a sweep behavior is associated with a camera over some duration, the camera changes its orientation over that duration. FIG. 30 illustrates the rotation of a camera during the duration of a sweep behavior and the effects of that motion on the rendered image. Screenshot 3000 shows a three-dimensional space at the beginning of the selected duration of a sweep behavior that has been associated with camera 2910. As the field of view indicator 2920 shows, just as in FIG. 29, at the beginning of the duration of the sweep behavior, the apple image 2930 and the circle image 2940 are both within the field of view of the camera 2910.

Screenshot 3001 shows the rendered frame corresponding to the three-dimensional space of screenshot 3001, i.e. at the beginning of the duration of the sweep behavior associated with the camera. As indicated above, apple image 2930 and circle image 2940 are within the field of view of the camera and because of this, they are shown in the rendered frame.

Screenshot 3002 shows the three-dimensional space later in the duration of the sweep behavior. At this time in the duration, the camera 2910 has turned on its axis. Only the apple image 2930 is in the field of view of the camera 2910. Also, the camera 2910 is oriented at an angle to the apple image 2930. The left edge of the apple image 2930 is farther away from the plane of the camera's field of view than the right edge. Accordingly, the corresponding rendered frame shown in screenshot 3003 shows the apple image 2930 skewed with the right side longer do to the simulated effects of perspective (e.g. closer objects look bigger).

Some embodiments provide one or more controls 3050 to allow a user to set the starting and ending angle of the camera. That is, the orientation of the camera at the beginning and ending of the duration of the associated sweep behavior. Some embodiments provide a control 3055 that sets a parameter for the behavior that affects how the camera moves over that distance. For example, if the control 3055 is set to constant, then the camera 2910 will turn by the same angle in each frame over the duration of the sweep behavior. In some embodiments, the control 3055 can be set to simulate the effects of inertia, moving slowly at the beginning of the duration, picking up angular speed as the duration progresses, traveling at a constant angular speed during the middle of the duration, then losing angular speed until it stops at the end of the duration (and the end of the selected rotation angle). Some embodiments provide a control 3060 that determines what axis the camera will pivot about over the duration of the associated sweep behavior. Some embodiments provide an option to pivot about axes in various different coordinate systems, for example, some embodiments provide a choice between a z-axis of the camera and an axis through the camera that is parallel to the global z-axis of the three-dimensional space.

Some embodiments have other parameters that affect the sweep behavior. For example, some embodiments provide controls that allow a user to specify the magnitude of the angle that the camera will rotate through over the duration. In such embodiments, the starting angle is determined by the original orientation of the camera.

Figure 31:
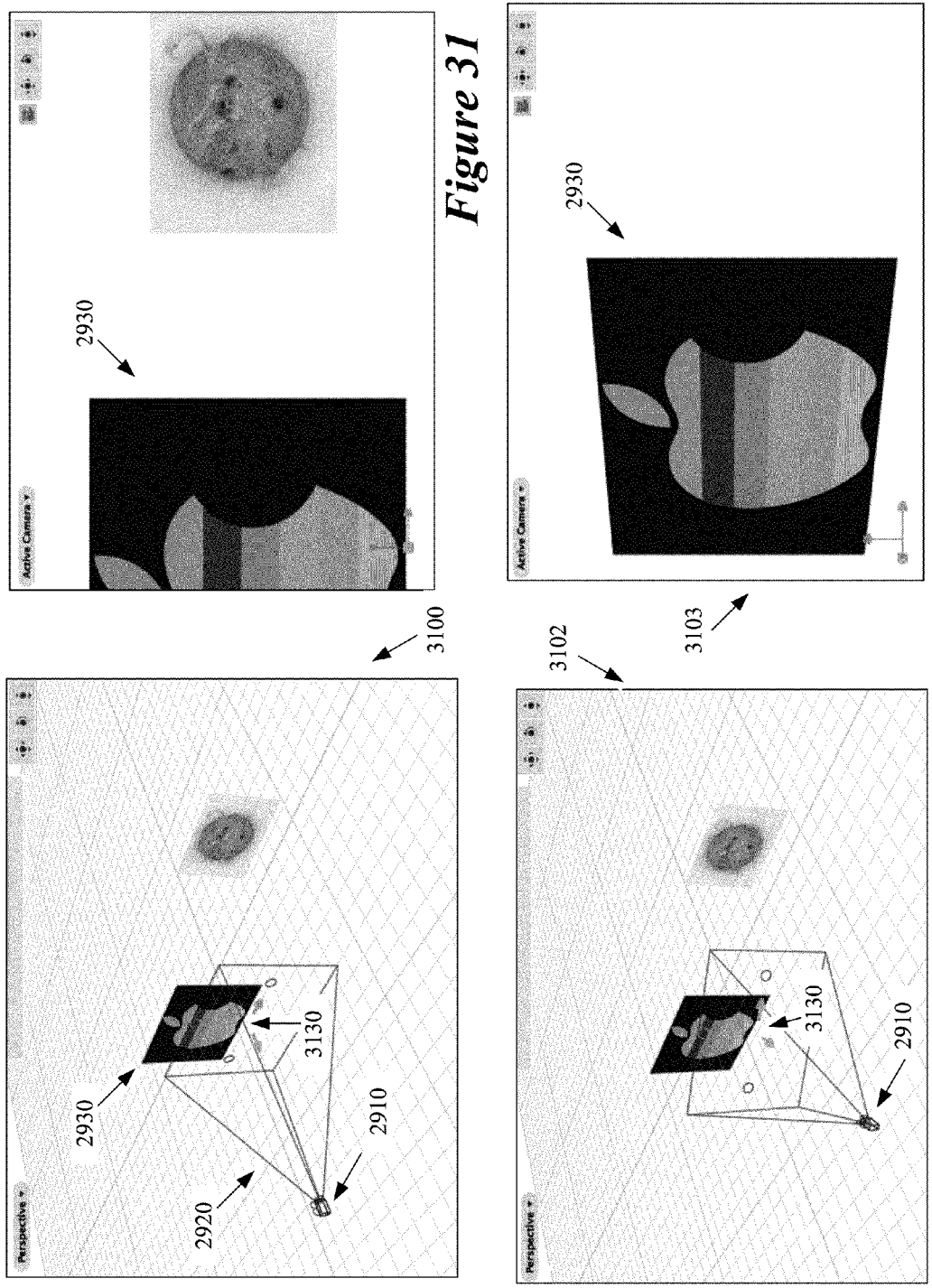
FIG. 31 illustrates an alternate sweep behavior of some embodiments.

FIG. 31 illustrates an alternate sweep behavior of some embodiments. This sweep behavior causes the camera 2910 to revolve about a particular point 3130, maintaining a constant distance from that point 3130 and pointing at it. From screenshot 3100 to screenshot 3102, some part of the duration of the sweep behavior associated with the camera 2910 has passed and the camera has revolves about point 3130. The apple image 2930 in the rendered frame shown in screenshot 3103 reflects the changes in the position and rotation of the camera. As was the case in the previously described sweep behavior, the apple image 2930 in screenshot 3103 appears larger on the right side because of perspective.

E. Zoom Behavior

Figure 32:
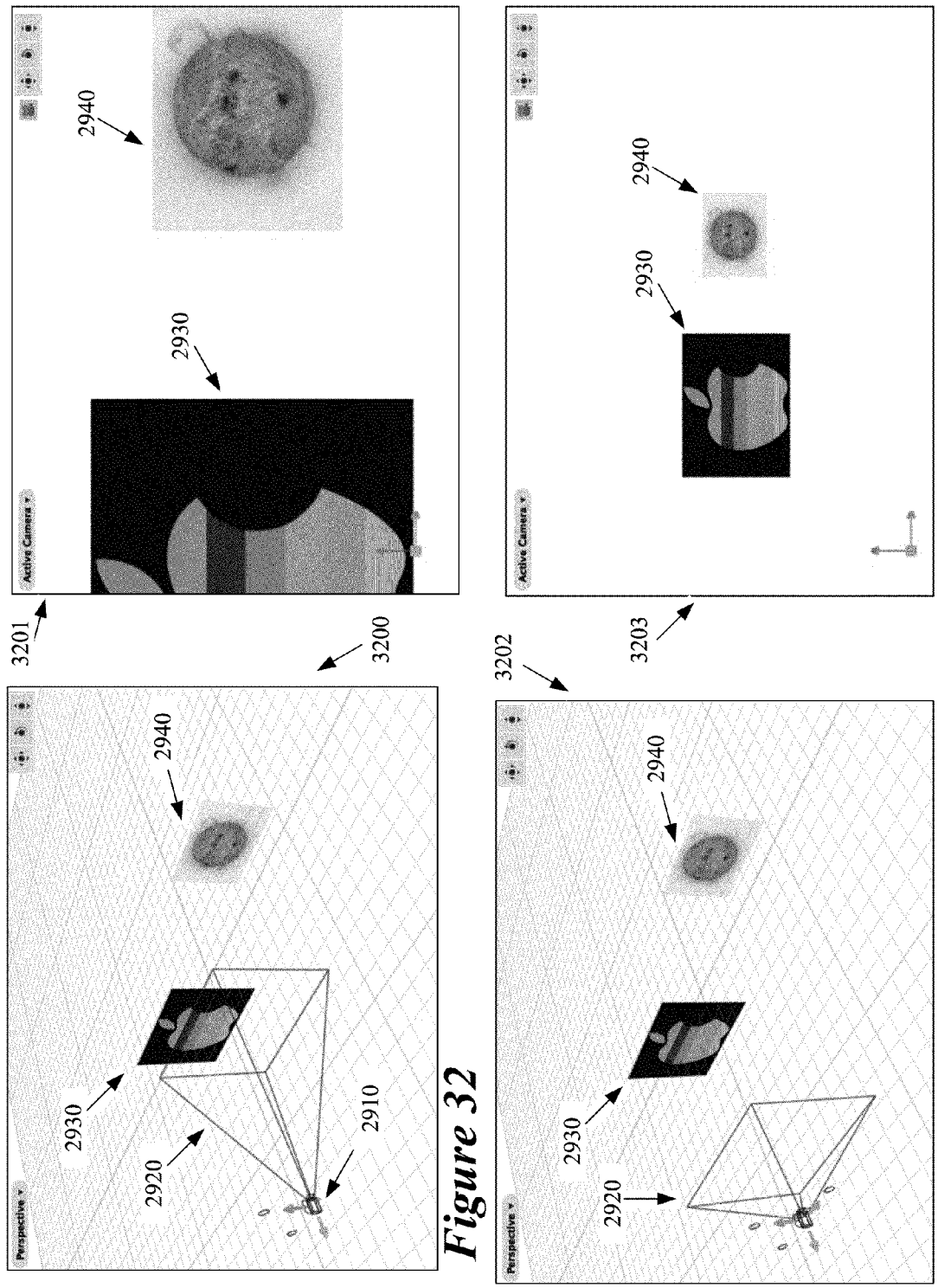
FIG. 32 illustrates the changing of the field of view of a camera and the effects of that change on the rendered image.

In some embodiments, when a zoom behavior is associated with a camera over some duration, the camera changes its field of view. FIG. 32 illustrates the changing of the field of view of camera 2910 and the effects of that change on the rendered image. Screenshot 3200 shows a three-dimensional space at the beginning of the selected duration of a zoom out behavior that has been associated with camera 2910. As the field of view indicator 2920 shows, just as in FIG. 29, at the beginning of the duration of the zoom behavior, the apple image 2930 and the circle image 2940 are both within the field of view of the camera 2910.

In screenshot 3200, the apple image 2930 and the circle image 2940 fill a considerable portion of the solid angle of the camera's 2910 field of view. Accordingly, the corresponding rendered frame in screenshot 3201 shows the apple image 2930 and circle image 2940 taking up a correspondingly large portion of the rendered frame in screenshot 3201.

Screenshot 3202 shows the three-dimensional space later in the duration of the zoom behavior. At this time in the duration, the camera 2910 is still in the same position and still has the same orientation, however, as the field of view indicator 2920 shows, the field of view now captures a substantially larger portion of the three dimensional space (e.g. the solid angle it "sees" is larger) the apple image 2930 and the circle image 2940 are still in the field of view of the camera 2910. However, they now take up a considerably smaller fraction of the total field of view. Accordingly, the corresponding rendered frame shown in screenshot 3203 shows the apple image 2930 and the circle image 2940 taking up a considerably smaller fraction of the rendered frame in screenshot 3203, even though the camera is the same distance from the objects as it was at the beginning of the duration when the rendered frame in screenshot 3201 was rendered.

Some embodiments provide one or more controls (not shown) to allow a user to set the starting and ending field of view of the camera. Some embodiments provide a control (not shown) that sets a parameter for the behavior that affects how the camera zooms over that duration. For example, if the control is set to constant, then the camera 2910 will zoom by the same amount in each frame over the duration of the zoom behavior.

Some embodiments have other parameters that affect the zoom behavior. For example, some embodiments provide controls that allow a user to specify the magnitude of the change in the zoom level (e.g. 2×, 3×, etc) that the camera will go through over the duration. In such embodiments, the starting field of view is determined by the original orientation of the camera.

E. Dolly-zoom Behavior

In some embodiments, when a dolly-zoom behavior is associated with a camera over some duration, the camera simultaneously changes its field of view and moves. The changes to the field of view and the motion are related in such a way as to keep any objects in a particular plane (a plane ahead of and at right angles to the motion of the camera) the same size. For example, if a camera is initially ten feet away from an object to five feet away from the object, the distance from that object has halved and the portion of the field of view that the object takes up doubles in height and width (i.e. a factor of ten feet over five feet). By zooming out by a factor of two, the camera can make that object appear to be the same size when it is five feet away and zoomed out as it was when it was ten feet away and zoomed in.

An object in the background, initially twenty-five feet away from the camera has also grown bigger because of the change in perspective, but only to 125% of its original size (i.e. a factor of twenty-five feet over twenty feet). Meanwhile the zoom out drops the apparent size of the background by just as big a factor as it drops the apparent size of the foreground (i.e. a factor of two in this example). The combination of moving the camera forward and zooming out has the net effect of reducing the apparent size of the background object by 62.5% (i.e. 125%/). Accordingly, when moving the camera toward the objects, the dolly-zoom effect keeps the foreground object the same apparent size and shrinks the background object(s).

Figure 33:
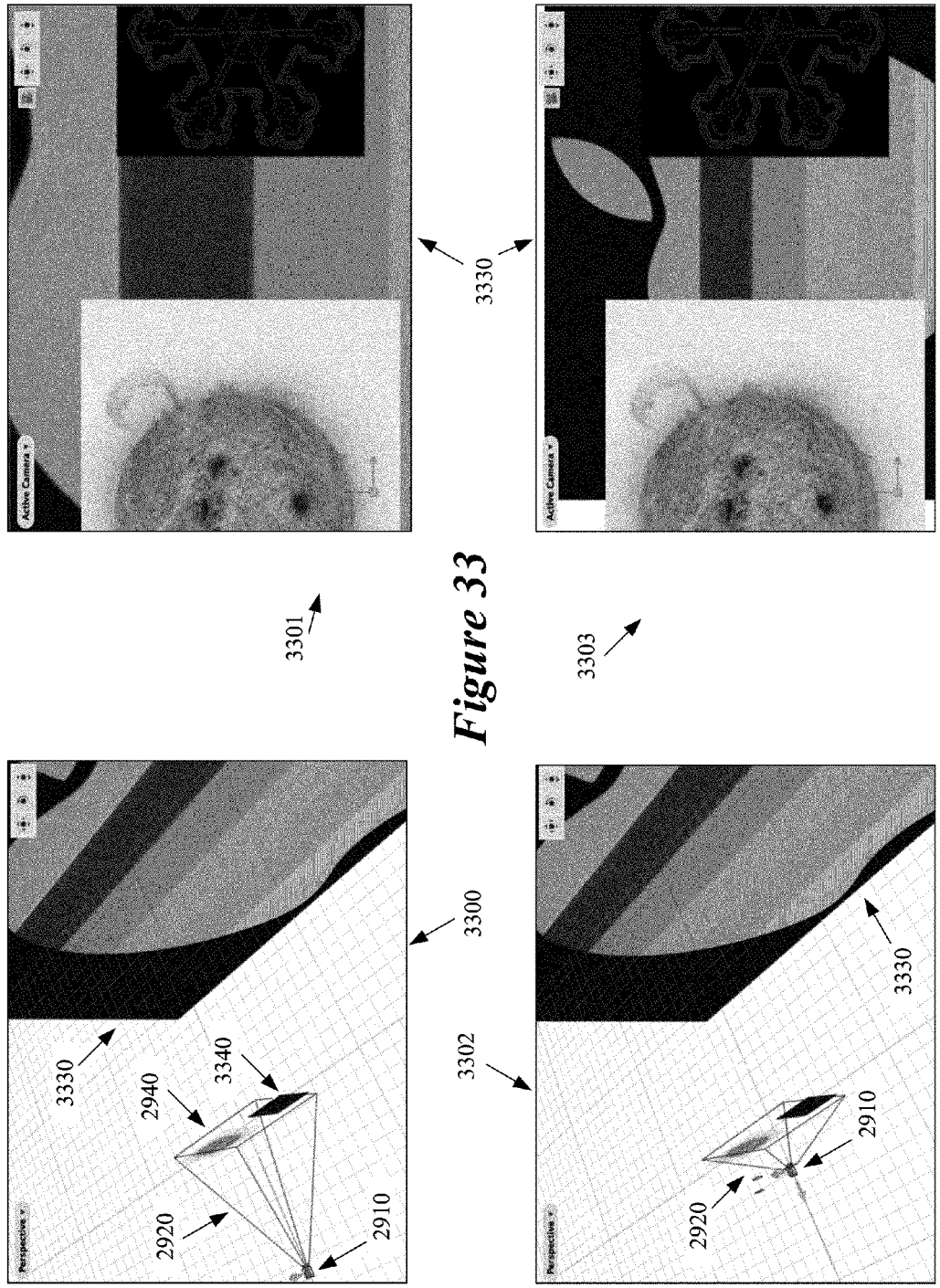
FIG. 33 illustrates the changing of the field of view and position of a camera and the effects of that change on the rendered image.

FIG. 33 illustrates the changing of the field of view and position of camera 2910 and the effects of that change on the rendered image. Screenshot 3300 shows a three-dimensional space at the beginning of the selected duration of a dolly-zoom behavior that has been associated with camera 2910.

In screenshot 3300 the camera 2910 is farther from the expanded apple image 3330 than it is from circle object 2940 and square object 3340. Because the front end of field of view indicator 2920 is in the same plane as the images 2940 and 3340, the rendered images of 2940 and 3340 will have the same size ratio as the size ratio of the images 2940 and 3340 to the front plane of the field of view indicator 2920. Accordingly, the rendered frame in screenshot 3301 shows the images 2940 and 3340 at that relative size, with the with apple image 3330 large in the background of the rendered frame.

Screenshot 3302 shows the three-dimensional space later in the duration of the dolly-zoom behavior. At this time in the duration, the camera 2910 has moved forward and expanded its field of view. Images 2940 and 3340 are still in the same plane as the end of the field of view indicator, and thus will be the same size in the rendered image in screenshot 3303. However, the apple image 3330 in the background has apparently reduced in size as a result of the dolly-zoom effect associated with the camera over the specified duration.

In some embodiments, an application provides parameter settings for a behavior for performing a transition from an initial set of camera settings (sometimes called capture parameters or operational parameters, e.g. location, orientation, and field of view) to a set of camera settings that allows some effect to be performed. For example, a framing behavior can include a transition duration to move the camera from an initial position and orientation into framing position and orientation, before the tracking duration in which the object is framed. Similarly a dolly-zoom behavior may have a transition duration to get into a starting position for performing a dolly-zoom.

Though the above behaviors have been described with regard to certain types of controls and parameters, these are examples of various embodiments. One of ordinary skill in the art will realize that other embodiments are within the scope of the invention. Accordingly, the intended limitations are the ones disclosed in the claims.

V. Computer System

Figure 34:
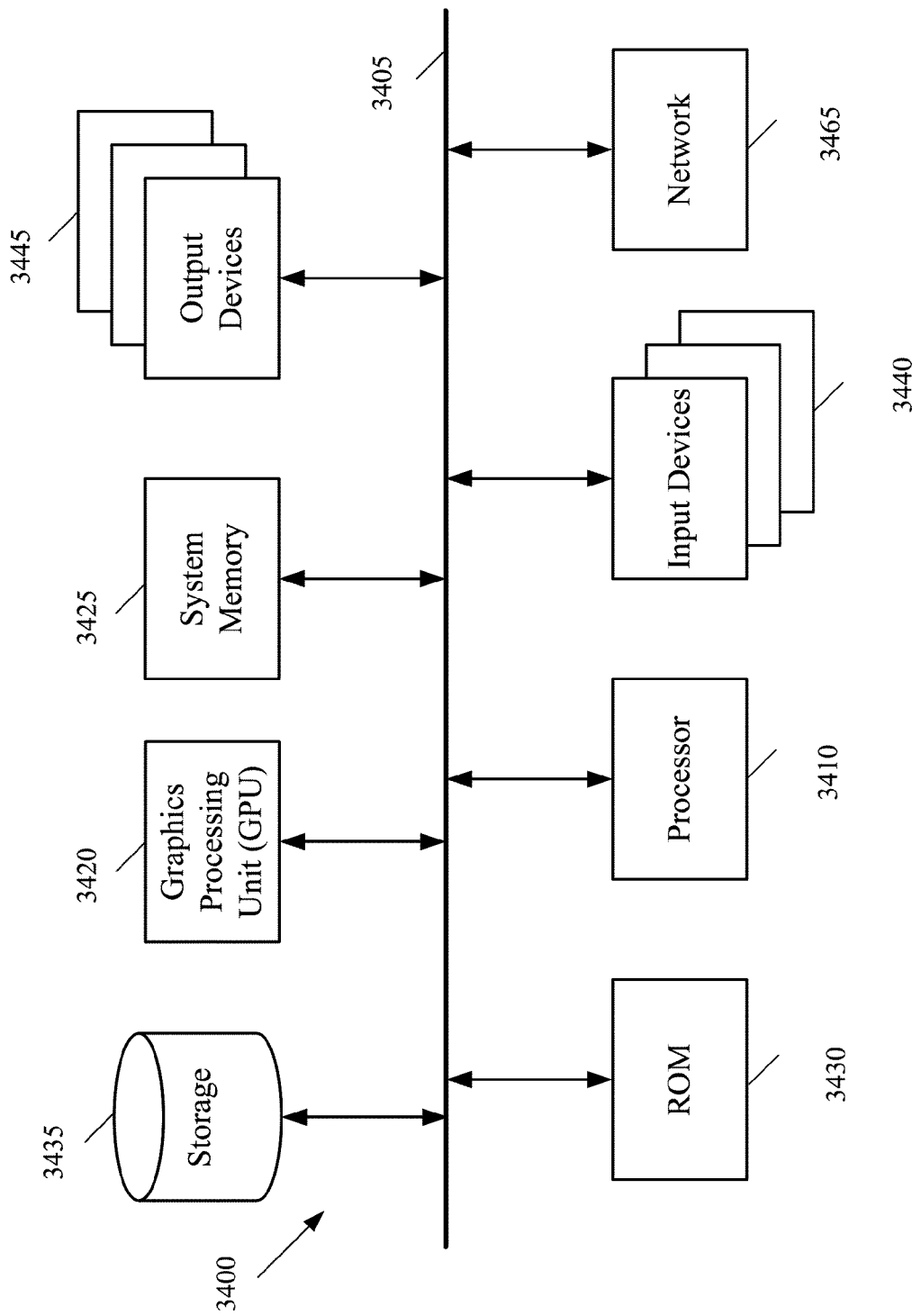
FIG. 34 illustrates a computer system with which some embodiments of the invention are implemented.

FIG. 34 illustrates a computer system with which some embodiments of the invention are implemented, such a computer system includes various types of computer readable mediums and interfaces for various other types of computer readable mediums. Computer system 3400 includes a bus 3405, a processor 3410, a graphics processing unit (GPU) 3420, a system memory 3425, a read-only memory 3430, a permanent storage device 3435, input devices 3440, and output devices 3445.

The bus 3405 collectively represents all system, peripheral, and chipset buses that communicatively connect the numerous internal devices of the computer system 3400. For instance, the bus 3405 communicatively connects the processor 3410 with the read-only memory 3430, the GPU 3420, the system memory 3425, and the permanent storage device 3435.

From these various memory units, the processor 3410 retrieves instructions to execute and data to process in order to execute the processes of the invention. Some instructions are passed to and executed by the GPU 3420. The GPU 3420 can offload various computations or complement the image processing provided by the processor 3410. In some embodiments, such functionality can be provided using CoreImage's kernel shading language.

The read-only-memory (ROM) 3430 stores static data and instructions that are needed by the processor 3410 and other modules of the computer system. The permanent storage device 3435, on the other hand, is a read-and-write memory device. This device is a non-volatile memory unit that stores instructions and data even when the computer system 3400 is off. Some embodiments of the invention use a mass-storage device (such as a magnetic or optical disk and its corresponding disk drive) as the permanent storage device 3435.

Other embodiments use a removable storage device (such as a floppy disk, flash drive, or ZIP® disk, and its corresponding disk drive) as the permanent storage device. Like the permanent storage device 3435, the system memory 3425 is a read-and-write memory device. However, unlike storage device 3435, the system memory is a volatile read-and-write memory, such a random access memory. The system memory stores some of the instructions and data that the processor needs at runtime. In some embodiments, the invention's processes are stored in the system memory 3425, the permanent storage device 3435, and/or the read-only memory 3430.

The bus 3405 also connects to the input and output devices 3440 and 3445. The input devices enable the user to communicate information and select commands to the computer system. The input devices 3440 include alphanumeric keyboards and pointing devices. The output devices 3445 display images generated by the computer system. For instance, these devices display a graphical user interface. The output devices include printers and display devices, such as cathode ray tubes (CRT) or liquid crystal displays (LCD).

Finally, as shown in FIG. 34, bus 3405 also couples computer 3400 to a network 3465 through a network adapter (not shown). In this manner, the computer can be a part of a network of computers (such as a local area network ("LAN"), a wide area network ("WAN"), or an Intranet, or a network of networks, such as the internet For example, the computer 3400 may be coupled to a web server (network 3465) so that a web browser executing on the computer 3400 can interact with the web server as a user interacts with a graphical user interface that operates in the web browser.

Any or all components of computer system 3400 may be used in conjunction with the invention. For instance, in some embodiments the execution of the frames of the rendering is performed by the GPU 3420 instead of the CPU 3410. Similarly, other image editing functions can be offloaded to the GPU 3420 where they are executed before the results are passed back into memory or the processor 3410. However, a common limitation of the GPU 3420 is the number of instructions that the GPU 3420 is able to store and process at any given time. Therefore, some embodiments adapt instructions for implementing processes so that these processes fit onto the instruction buffer of the GPU 3420 for execution locally on the GPU 3420. Additionally, some GPUs 3420 do not contain sufficient processing resources to execute the processes of some embodiments and therefore the CPU 3410 executes the instructions. One of ordinary skill in the art would appreciate that any other system configuration may also be used in conjunction with the present invention.

One of ordinary skill in the art will realize that some of the features described in this application are present in prior art (e.g. 3D compositing applications), however, they have not been used in combination with other features described herein. Furthermore, while the invention has been described with reference to numerous specific details, one of ordinary skill in the art will recognize that the invention can be embodied in other specific forms without departing from the spirit of the invention. For instance, Apple Mac OS® environment applications are used to create some of these examples, a person of ordinary skill in the art would realize that the invention may be practiced in other operating environments such as Microsoft Windows®, UNIX, Linux, etc., and other applications such as games, without the use of these specific details. Also, some of the examples may be executed on a GPU or CPU of a computer system depending on the computing resources available on the computer system or alternatively on any electronic device that is able to view images. Thus, one of ordinary skill in the art would understood that the invention is not to be limited by the foregoing illustrative details, but rather is to be defined by the appended claims.

We claim:

1. A non-transitory computer readable medium storing a computer program for directing a simulated camera in a three-dimensional simulated space, said computer program comprising sets of instructions for:
   receiving a command to associate said simulated camera with an object in said simulated space for a set duration;
   determining, based on said command, a path along which the simulated camera moves over said duration, said moving comprising:
      moving said simulated camera from a first position and an orientation that does not aim at the object to a second position near said object while aiming said simulated camera at said object; and
      moving said simulated camera with said object; and
   creating a video from said simulated camera's perspective of said three-dimensional simulated space.

2. The non-transitory computer readable medium of claim 1, wherein moving said simulated camera to said second position near said object comprises moving said simulated camera through said three-dimensional simulated space to a location and orientation wherein said simulated camera points at a particular side of said object at a distance such that said object fills a particular portion of said simulated camera's field of view.

3. The non-transitory computer readable medium of claim 1, wherein moving said simulated camera with said object comprises determining a path for moving said simulated camera such that said camera's view of said object does not change while said object moves on a pre-determined path in said three-dimensional simulated space for at least part of the set duration.

4. The non-transitory computer readable medium of claim 1, wherein said object is a first object and said path is a first path, wherein said computer program further comprises a set of instructions for determining a second path for moving said simulated camera to a location and orientation wherein said simulated camera points at a particular side of a second object at a distance such that said second object fills a particular portion of said simulated camera's field of view.

5. The non-transitory computer readable medium of claim 1, wherein said computer program further comprises a set of instructions for receiving adjustments to said path by a user.

6. The non-transitory computer readable medium of claim 1, wherein said object has a set of axes that define its orientation and moving said simulated camera to said second position near said object while aiming said simulated camera at said object comprises pointing said simulated camera at said object along a specific direction relative to said set of axes.

7. The non-transitory computer readable medium of claim 6, wherein moving said simulated camera to said second position near said object while aiming said simulated camera at said object further comprises positioning said simulated camera so that the camera (i) points in the same direction as an axis of said object and (ii) is a distance away from said object such that said object fills a particular portion of said camera's field of view.

8. The non-transitory computer readable medium of claim 7, wherein moving said simulated camera to said second position near said object and aiming said simulated camera at said object further comprises positioning said simulated camera such that an up direction of said simulated camera's field of view corresponds to an up direction of said object.

9. The non-transitory computer readable medium of claim 1, wherein said computer program further comprises a set of instructions for receiving a time setting that defines a starting time and a duration for moving said simulated camera to said object.

10. The non-transitory computer readable medium of claim 1, wherein said computer program further comprises a set of instructions for receiving a first time setting that defines a start time and a duration for moving said simulated camera to said object while aiming said simulated camera at said object and a second time setting that defines a start time and a duration for moving said simulated camera with said object.

11. The non-transitory computer readable medium of claim 10, wherein said object is a first object and said computer program further comprises a set of instructions for receiving a third time setting that defines a starting time and a duration for moving said simulated camera to a second object.

12. A method for providing a video compositing application for execution by a computer, the method comprising:
   providing a first tool for selecting a virtual camera that renders a computer generated scene from a particular location and orientation;
   providing a second tool for specifying a particular object in the computer generated scene to associate with said virtual camera, wherein the computer generated scene contains a plurality of objects the location and orientation of which are user-adjustable within the scene; and
   providing a third user-adjustable tool for specifying a duration during which the particular object will be associated with said virtual camera, wherein said association causes the camera to keep the particular object in a field of view of the virtual camera during said duration.

13. The method of claim 12, wherein said association further causes the virtual camera to move to place the particular object in said field of view of said virtual camera.

14. The method of claim 13 further comprising providing a fourth tool for specifying a fraction of said duration for placing said particular object in said field of view.

15. The method of claim 12 further comprising providing a tool for selecting a fraction of said duration during which the virtual camera moves away from the particular object.

16. The method of claim 12, wherein said tool for specifying the particular object to associate with said camera is for associating multiple objects with said camera.

17. A computing device comprising a memory and a graphical user interface (GUI), said GUI comprising:
- a display area for displaying first and second simulated objects and a virtual camera in a computer generated three-dimensional space;
- a first control for associating with the virtual camera (i) a first behavior to cause the virtual camera to follow the first object over a first time duration and (ii) a second behavior to cause the virtual camera to follow the second object over a second time duration;
- a second control for specifying the first time duration and the second time duration; and
- a third control for starting a rendering operation for generating a video clip that comprises a view from the virtual camera of the first object during the first time duration and a view from the virtual camera of the second object during the second time duration subsequent to the first time duration.

18. The computing device of claim 17, wherein said GUI comprises a control for setting a magnitude of an effect of the first behavior on said virtual camera over the first time duration.

19. The computing device of claim 18, wherein said GUI further comprises a control for setting the first behavior to change in a non-linear manner over said first time duration.

20. The computing device of claim 19, wherein said GUI further comprises a control for setting the first behavior to ramp up over part of said first time duration.

21. The computing device of claim 20, wherein the control for setting the magnitude is further for setting a magnitude of an effect of the second behavior, the control for setting the first behavior to change in a non-linear manner is further for setting the second behavior to change in a non-linear manner over the second time duration, and the control for setting the first behavior to ramp up is further for setting the second behavior to ramp up over part of the second time duration.

22. The computing device of claim 17, wherein the first behavior changes at least two parameters of said virtual camera.

23. The computing device of claim 22, wherein said GUI further comprises (i) a tool for setting a time duration for ramping up changes by the first behavior to a first parameter over a first fraction of said time duration and (ii) a tool for ramping up changes by said first behavior to a second parameter over a second fraction of said time duration.

24. The computing device of claim 17, wherein said first behavior causes the virtual camera to rotate about a specified axis through said virtual camera.

25. The computing device of claim 17, wherein said first behavior causes said virtual camera to revolve about a specified point while said camera rotates to face said point.

26. For a virtual camera that renders a portion of a computer generated three dimensional scene including at least first, second, and third objects, a method comprising:
- receiving a selection of a behavior for the virtual camera to track the first object through the three dimensional scene;
- receiving a duration for the received behavior during which the virtual camera tracks the first object, wherein the virtual camera takes a path through the scene between the second and third objects in order to track the first object; and
- rendering the scene from a perspective of the virtual camera during the duration as the virtual camera tracks the first object.

27. The method of claim 26, wherein the computer generated three dimensional scene includes fourth and fifth objects and the virtual camera takes a path through the scene between the fourth and fifth objects in order to approach the first object before tracking the first object.

28. The method of claim 26, wherein the received behavior affects a set of capture parameters of the virtual camera as the virtual camera tracks the first object, the capture parameters comprising the location, orientation, and field of view of the virtual camera.

29. The method of claim 26, wherein the behavior is a first behavior, the method further comprising receiving a selection of a second behavior for the virtual camera to track the second object through the three dimensional scene.

30. The method of claim 29, wherein the path through the scene is a first path and after completing the first path the virtual camera takes a second path through the scene in order to track the second object.

31. The method of claim 26, wherein rendering the scene comprises rendering at a user-adjustable level of detail.

* * * * *